US008528745B2

(12) United States Patent
Husain et al.

(10) Patent No.: US 8,528,745 B2
(45) Date of Patent: Sep. 10, 2013

(54) MEMBRANE SUPPORTED BIOFILM APPARATUS

(75) Inventors: Hidayat Husain, Oakville (CA); Rocco Mazzaferro, Waterdown (CA); Minggang Liu, Burlington (CA); Richard Wong, Thornhill (CA); Heather Lossing, Hamilton (CA); Fengshen Fan, Guelph (CA); Youngseck Hong, Burlington (CA); Reid Bayly, Toronto (CA)

(73) Assignee: General Electric Company, Schenectady, NY (US)

( * ) Notice: Subject to any disclaimer, the term of this patent is extended or adjusted under 35 U.S.C. 154(b) by 478 days.

(21) Appl. No.: 12/596,795

(22) PCT Filed: Apr. 14, 2008

(86) PCT No.: PCT/US2008/060195
§ 371 (c)(1),
(2), (4) Date: Oct. 20, 2009

(87) PCT Pub. No.: WO2008/130885
PCT Pub. Date: Oct. 30, 2008

(65) Prior Publication Data
US 2010/0126929 A1    May 27, 2010

Related U.S. Application Data
(60) Provisional application No. 60/913,195, filed on Apr. 20, 2007.

(51) Int. Cl.
*B01D 33/21* (2006.01)
(52) U.S. Cl.
USPC ................................................. 210/500.23

(58) Field of Classification Search
USPC ........................................... 210/500.23
See application file for complete search history.

(56) References Cited

U.S. PATENT DOCUMENTS

| 2,458,163 A | 1/1949 | Hays |
| 3,422,008 A | 1/1969 | McLain |

(Continued)

FOREIGN PATENT DOCUMENTS

| CA | 1096976 A1 | 3/1981 |
| CA | 1177977 A1 | 11/1984 |

(Continued)

OTHER PUBLICATIONS

International Search Report issued in connection with corresponding PCT Application No. PCT/US2008/060195 on Dec. 30, 2009.

(Continued)

*Primary Examiner* — Chester Barry
(74) *Attorney, Agent, or Firm* — GE Global Patent Operation; Catherine J. Winter

(57) ABSTRACT

A membrane supported biofilm apparatus has a plurality of hollow fiber gas permeable membranes in a tank containing water to be treated. The membranes have an outside diameter of about 200 microns or less and occupy between 0.5% and 4% of the tank volume. A biofilm supported on the membranes occupies between about 40% and 80% of the volume of water to be treated in a reactor. The membranes may be oriented generally vertically and a spreader may be located near the bottom of the apparatus to disperse the membranes. Wastewater treatment processes are described. A process to dentrify water or treat oxidized contaminants comprises introducing hydrogen into an inner volume of the membranes to grow autotrophic organisms in the biofilm near the membrane and heterotrophic organism near the water. Another process is operated at a biomass concentration of at least 10 g/L and up to about 40 g/L to maintain a biofilm having a surface area of over 1000 square metres per cubic metre of tank volume. A hybrid process has suspended biomass and a membrane supported biofilm.

10 Claims, 12 Drawing Sheets

(56) References Cited

U.S. PATENT DOCUMENTS

| | | | |
|---|---|---|---|
| 4,126,544 A | 11/1978 | Baensch et al. |
| 4,181,604 A | 1/1980 | Onishi et al. |
| 4,328,102 A | 5/1982 | Bellhouse et al. |
| 4,341,005 A | 7/1982 | Oscarsson |
| 4,416,993 A | 11/1983 | McKeown |
| 4,664,681 A | 5/1987 | Anazawa et al. |
| 4,746,435 A | 5/1988 | Onishi et al. |
| 4,883,594 A | 11/1989 | Sekoulov et al. |
| 4,960,546 A | 10/1990 | Tharp |
| 5,015,421 A | 5/1991 | Messner |
| 5,034,164 A | 7/1991 | Semmens |
| 5,043,140 A | 8/1991 | Combs |
| 5,116,506 A | 5/1992 | Williamson et al. |
| 5,126,050 A | 6/1992 | Irvine et al. |
| 5,149,649 A | 9/1992 | Miyamori et al. |
| 5,238,562 A | 8/1993 | Rogut |
| 5,282,964 A | 2/1994 | Young et al. |
| 5,395,468 A | 3/1995 | Juliar et al. |
| 5,439,736 A | 8/1995 | Nomura |
| 5,482,859 A | 1/1996 | Biller et al. |
| 5,486,475 A | 1/1996 | Kramer et al. |
| 5,518,620 A | 5/1996 | Eguchi et al. |
| 5,520,812 A | 5/1996 | Ryhiner et al. |
| 5,523,003 A | 6/1996 | Sell et al. |
| 5,543,039 A | 8/1996 | Odegaard |
| 5,647,986 A | 7/1997 | Nawathe et al. |
| 5,716,689 A | 2/1998 | Rogut |
| 5,945,002 A | 8/1999 | Leukes et al. |
| 6,001,585 A | 12/1999 | Gramer |
| 6,013,511 A | 1/2000 | Diels et al. |
| 6,183,643 B1 | 2/2001 | Goodley |
| 6,209,855 B1 | 4/2001 | Glassford |
| 6,241,867 B1 | 6/2001 | Mir |
| 6,299,774 B1 | 10/2001 | Ainsworth et al. |
| 6,309,550 B1 | 10/2001 | Iversen |
| 6,354,444 B1 | 3/2002 | Mahendran et al. |
| 6,361,695 B1 | 3/2002 | Husain et al. |
| 6,387,262 B1 | 5/2002 | Rittmann et al. |
| 6,531,062 B1 | 3/2003 | Whitehill |
| 6,543,753 B1 | 4/2003 | Tharp |
| 6,555,002 B2 | 4/2003 | Garcia et al. |
| 6,558,549 B2 | 5/2003 | Cote et al. |
| 6,592,759 B2 | 7/2003 | Rabie et al. |
| 6,641,733 B2 | 11/2003 | Zha et al. |
| 6,685,832 B2 | 2/2004 | Mahendran et al. |
| 6,752,926 B2 | 6/2004 | Christodoulatos et al. |
| 6,863,815 B1 | 3/2005 | Smith |
| 6,878,279 B2 | 4/2005 | Davis et al. |
| 7,175,763 B2 | 2/2007 | Husain et al. |
| 7,186,340 B1 | 3/2007 | Rittmann et al. |
| 2001/0037967 A1 | 11/2001 | Rabie et al. |
| 2002/0020666 A1 | 2/2002 | Cote et al. |
| 2002/0171172 A1 | 11/2002 | Lowell |
| 2003/0092020 A1 | 5/2003 | Carson et al. |
| 2003/0104192 A1 | 6/2003 | Hester et al. |
| 2003/0203183 A1 | 10/2003 | Hester et al. |
| 2004/0060442 A1 | 4/2004 | Nakahara et al. |
| 2004/0115782 A1 | 6/2004 | Paterek |
| 2004/0211723 A1 | 10/2004 | Husain et al. |
| 2004/0224396 A1 | 11/2004 | Maston |
| 2005/0064577 A1 | 3/2005 | Berzin |
| 2005/0260739 A1 | 11/2005 | Rosen et al. |
| 2005/0269263 A1 | 12/2005 | Rittmann et al. |
| 2007/0001324 A1* | 1/2007 | Cote et al. ............ 261/122.1 |
| 2008/0093299 A1* | 4/2008 | Mahendran et al. ......... 210/650 |

FOREIGN PATENT DOCUMENTS

| | | |
|---|---|---|
| CA | 2005959 A1 | 6/1990 |
| CA | 2100002 A1 | 2/1994 |
| CA | 2182915 A1 | 2/1997 |
| CA | 2356316 A1 | 2/1999 |
| CA | 2300719 A1 | 9/2001 |
| CA | 2102156 C | 9/2003 |
| CA | 2458566 A1 | 8/2004 |
| DE | 3544382 A1 | 6/1987 |
| DE | 3730797 A1 | 3/1989 |
| DE | 4440464 C1 | 6/1996 |
| EP | 0049954 B1 | 12/1984 |
| EP | 1938889 A1 | 7/2008 |
| JP | 54-21057 A | 2/1979 |
| JP | 11319506 A | 11/1999 |
| WO | 87/03615 A2 | 6/1987 |
| WO | 0166474 A | 9/2001 |
| WO | 03016165 A1 | 2/2003 |
| WO | 2004071973 A | 8/2004 |
| WO | 2005016498 A | 2/2005 |
| WO | 2005/113456 A2 | 12/2005 |
| WO | 2006015496 A | 2/2006 |

OTHER PUBLICATIONS

Witten Opinion issued in connection with corresponding PCT Application No. PCT/US2008/060195 on Dec. 30, 2009.

Dr. Michael J. Semmens and Denise Hanus, "Studies of a Membrane Aerated Bioreactor for Wastewater Treatment", Cranfield University, Jun. 1999.

Brindle et al., "Nitrification and Oxygen Utilisation in a Membrane Aeration Bioreactor", Journal of Membrane Science, 1998.

Cote et al., "Bubble-free Aeration Using Membranes: Process Analysis", Journal Water Pollution Control Federation, Nov. 1998.

Show-John Yeh and Charles R. Jenkins, "Pure Oxygen Fixed Film Reactor", Journal of the Environmental Engineering Division, Aug. 1978, pp. 611-623.

C.R. Woolard, "The Advantages of Periodically Operated Biofilm Reactors for the Treatment of Highly Variable Wastewater", Wat. Sci. Tech. vol. 35, No. 1., 1997, pp. 199-206.

Krystyna Twarowska-Schmidt and Andrzej Wlochowicz, "Meltspun Asymmetric Poly (4-methyl-1-pentene) Hollow Fibre Membranes", Journal of Membrane Science 137 (1997), pp. 55-61.

Yamagiwa et al., "Simultaneous Organic Carbon Removal and Nitrification by Biofim Formed on Oxygen Enrichment Membrane", Journal of Chemical Engineering of Japan, Oct. 27, 1994, pp. 638-643.

Casey et al., "Review of Membrane Aerated Biofilm Reactors", Resources, Conservation and Recycling 27 (1999), pp. 203-215.

Cote et al., "Bubble-free aeration using Membranes: Mass Transfer Analysis", Journal of Membrane Science, 1989.

Ahmed et al., "Use of sealed end hollow fibers for bubbleless membrane aeration: experimental studies", Journal of Membrane Science, 69 (1992) 1-10.

* cited by examiner

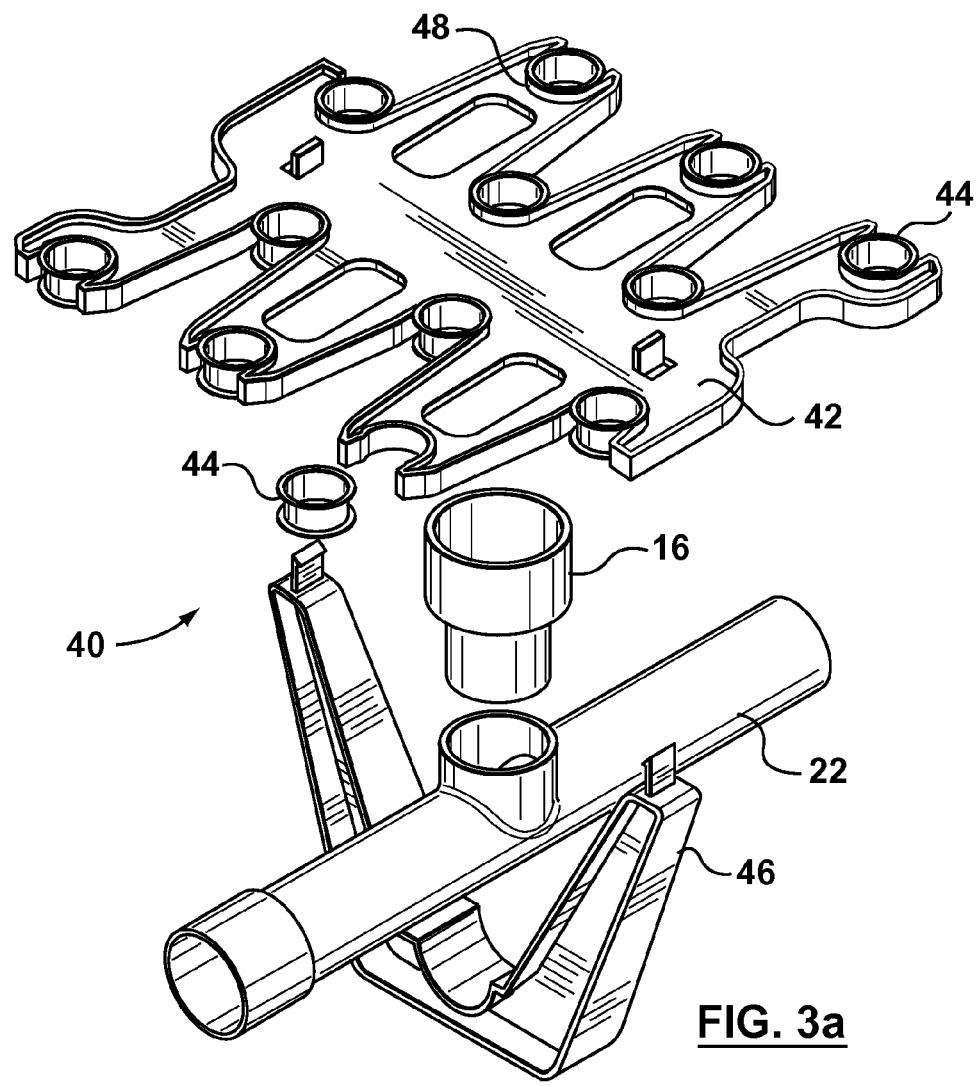
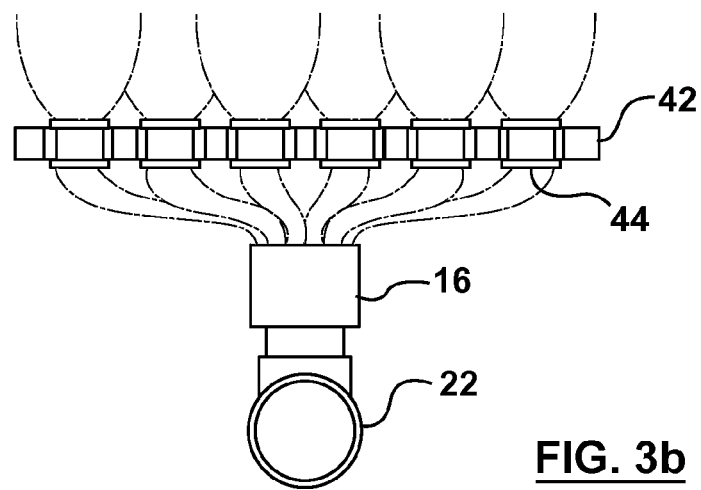
FIG. 3a
FIG. 3b

MEMBRANE SUPPORTED BIOFILM APPARATUS

For the United States of America, this application claims the benefit under 35 USC 119(e) of U.S. Application Ser. No. 60/913,195 filed on Apr. 20, 2007 which is incorporated herein in its entirety by this reference to it.

FIELD

This specification relates to an apparatus for supporting a biofilm on a gas transfer membrane or to a process for treating water using a biofilm supported on a membrane.

BACKGROUND

The following is not an admission that anything discussed herein is citable as prior art or part of the common general knowledge of persons skilled in the art.

International (WIPO) publications WO/2001/066474, WO/2004/071973, WO/2005/016498, WO/2005/016826 and WO/2006/015496 describe various membrane supported biofilm devices or processes. These publications are incorporated herein in their entirety by this reference to them. These documents describe various apparatus or process details that may be useful in working with a membrane supported biofilm, although statements in these publications or in U.S. Application Ser. No. 60/913,195 do not limit or define the claims of this patent.

International publication number WO/20018066174 describes an apparatus to transfer gas to or from a liquid having a flexible and oxygen permeable but liquid water impermeable membrane, a flexible and gas permeable spacer, an inlet conduit, an outlet conduit and a non-rigid restraint system. When used for treating wastewater, an aerobic biofilm is cultured adjacent the planar elements, an anoxic biofilm is cultivated adjacent the aerobic biofilm and the wastewater is maintained in an anaerobic state. A first reactor for treating wastewater has an anaerobic section, a plurality of gas transfer membrane modules, and an aerobic section. A biofilm is cultivated on the surface of the gas transfer membranes in fluid communication with the anaerobic section. Biological reduction of COD, BOD, nitrogen and phosphorous are achieved. In a second reactor, phosphorous is also removed chemically in a precipitation branch.

International publication number WO/2004/071973 describes a membrane supported biofilm reactor with modules having fine, hollow fibres, for example, made from dense wall Poly methylpentene (PMP) used in tows or formed into a fabric. In one module, one or more sheets of the fabric are potted into a module to enable oxygen containing gas to be supplied to the lumens of the hollow fibres. Various reactors and processes, for example to treat wastewater, using such modules are described. Mechanical, chemical and biological methods are used to control the thickness of the biofilm.

International publication number WO/2005/016498 describes a membrane module apparatus to transfer a gas to or from a liquid having a sheet with at least one gas transfer surface. The gas transfer surface is in flow communication with a header through a gas channel. The module may be used to support a biofilm on the gas transfer surface. A plurality of sheets or portions of sheets may be separated by spacers.

International publication number WO/2005/016826 describes a membrane supported biofilm reactor with modules having fine, hollow fibres, for example, made from melt spun thermoplastic polymers treated after spinning to increase their permeability to oxygen, used, for example, in tows or formed into a fabric. In one module, one or more sheets of the fabric are potted into a module to enable oxygen containing gas to be supplied to the lumens of the hollow fibres. Various reactors and processes, for example to treat wastewater, using such modules are described. In one process, oxygen travels through fibers, optionally through an attached biofilm, to oxygenate surrounding water. Mechanical, chemical and biological methods, for example endogenous respiration, are used to control the thickness of the biofilm.

International publication number WO/2006/015496 describes a module with hollow gas transfer fibers arranged in tows and potted into a module. The module may be used to treat wastewater by supplying hydrogen containing gas via the interior of the fibers to a biofilm present on an exterior surface of the fibers.

SUMMARY

The following summary is intended to introduce the reader to this disclosure, but does not limit or define any claimed invention.

A membrane supported biofilm apparatus has a plurality of membranes that are permeable to gases but do not permit bulk liquid water flow. The membranes, and structures holding the membranes, are configured to provide an inner volume open to a supply of a gas. The membranes may be immersed in water to be treated with the inner volume separated from the water by the membrane walls. In operation, a gas fed to the inner volume permeates through the membrane walls to encourage the growth of a biofilm supported on the outer surface of the membrane walls. Organisms in the biofilm treat the water by way of one or more biological processes.

A membrane supported biofilm apparatus may have a plurality of hollow fiber membranes. The membranes may have an outside diameter of about 200 microns or less. The membranes may be collected at a lower end in a header. Upper ends of the membranes may be held or floated near a water surface when the module is immersed in a tank with the header on or near the bottom of the tank. A spreader near the header may horizontally space some of the plurality of membranes from others of the plurality of membranes.

Hollow fiber membranes for supporting a biofilm may be placed in a tank at a dry packing density in the range of about 0.5% to 4%. In a multi-stage system, a first module located in a first tank may have a lower dry fiber packing density than a second module located in a second tank downstream of the first tank. A biofilm supported on the membranes may occupy 40% or more, and up to about 70% or 80% of the reactor volume. A mixer and a solids removal port may be provided in association with the tank.

A process for treating water using a membrane supported biofilm may be used to dentrify water or to reduce other oxidized contaminants such as nitrate, nitrite, perchlorate or arsenate. Hydrogen is introduced into the inner volume of the membranes and a carbon source is added to the water. A biofilm is grown on the membranes and has autotrophic organisms near the membrane and heterotrophic organisms near the water. Carbon dioxide may also be added to the inner volume.

In another process, a membrane supported biofilm is to treat wastewater having over 2000 mg/L CODt. A biomass concentration of at least 20 g/L and up to about 40 g/L is maintained. A biofilm is maintained having a surface area of at least about 1000 square metres per cubic metre of water being treated in the reactor. The biofilm may occupy between about 50% and 80% of the volume of the tank.

A hybrid bioreactor and process may have a suspended biomass and a membrane supported biofilm. The reactor and process may be used to treat wastewater. The reactor may have a solids separation device downstream of a tank containing the biofilm and a recycle of separated solids to the tank. The recycle may pass through an anoxic stage before returning to the tank. The tank may have a mixer to keep the suspended biomass in suspension. The tank may have an aerator, which may also function as a mixer, to supply a gas to the suspended biomass.

BRIEF DESCRIPTION OF THE DRAWINGS

FIG. 3a is an exploded isometric drawing of a spreader assembly.

FIG. 3b is a side view of the spreader assembly of FIG. 3a installed in a module of FIGS. 1a and 1b.

FIG. 4 is an isometric drawing of another cassette having modules as in FIGS. 1a and 1b with a spreader assembly of FIG. 3a.

FIG. 6b is a cross-sectional view along line 6B-6B of FIG. 6a.

DETAILED DESCRIPTION

A Hollow Fiber Membrane Supported Biofilm Module, System and Process

Figures 1A, 1B:
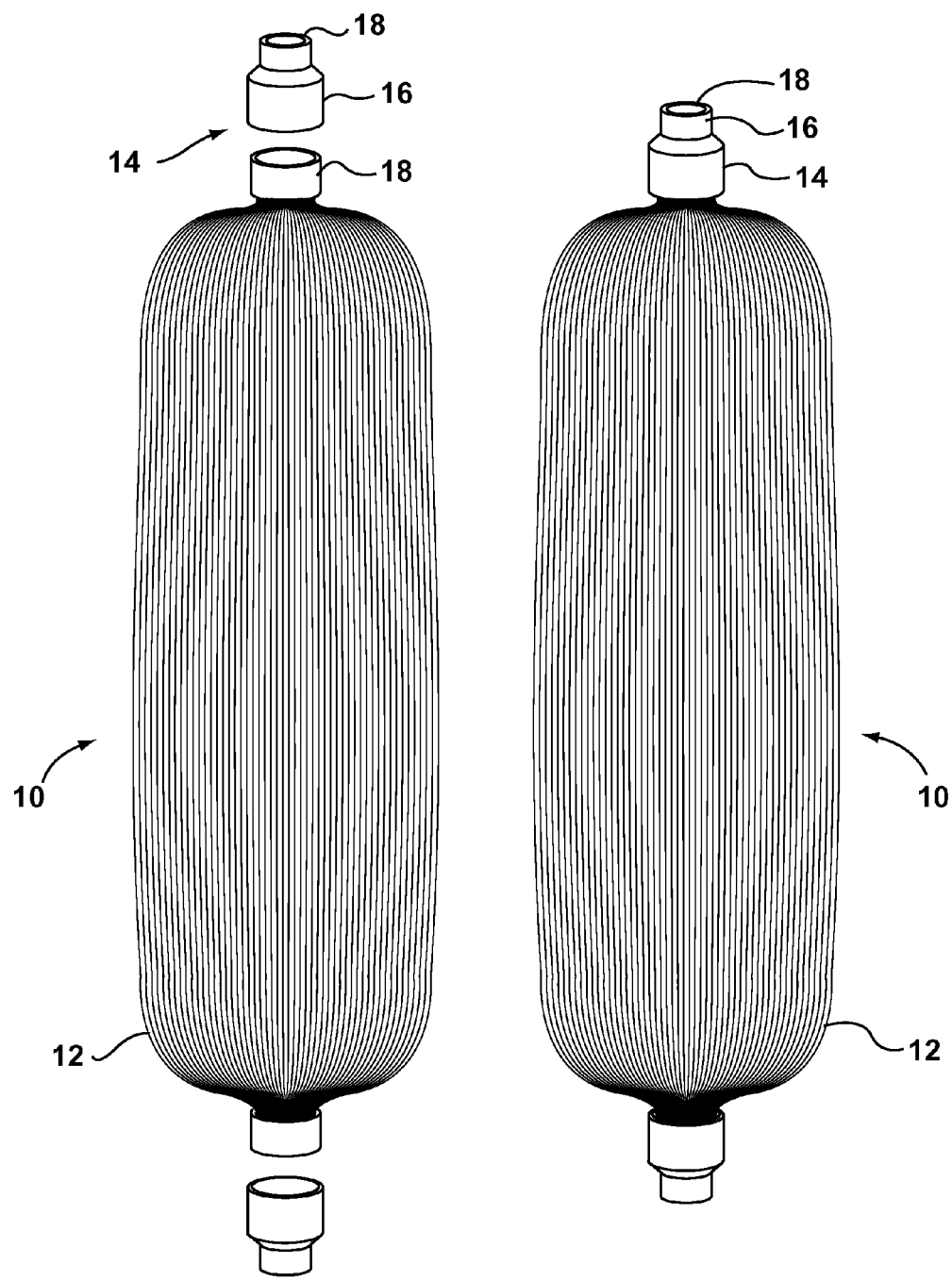
FIGS. 1a and 1b are side views of a module of hollow fiber membranes in exploded and assembled views respectively.

FIGS. 1a and 1b show a membrane supported biofilm module 10 having a bundle of membranes 12. The membranes 12 shown are hollow fibers with an open lumen surrounded by a wall of the membrane 12. The membranes 12 are permeable to oxygen, hydrogen or other gases but water does not wet openings in the membrane and does flow though the membranes by advective, Poiseuille or bulk flow. The membranes 12 may be dense walled, having openings through the membrane walls of about 30 Angstroms or less and allowing the passage of gas by molecular diffusion or dissolution-diffusion. Alternately, the membranes 12 may be semi-porous with slightly larger openings in the walls, for example up to about 40 Angstroms, but still not large enough to be wetted or permit a flow of water by advective, Poiseuille or bulk flow. The membranes 12 may be fine, having an outside diameter of 200 microns or less. Because the membranes 12 are so fine, a module 10 as shown would typically have thousands of membranes 12 which would be very difficult to see individually without being very close to the module 10. Because it would be impossible to draw all of the membranes 12, the Figures herein show only a few representative membranes 12 with their diameters magnified, or a dashed line outline of the outer surface of a bundle of the membranes 12. Groups of membranes 12, for example 20 to 100, may be collected together in tows to aid in handling and manufacturing modules 10.

Still referring to FIGS. 1a and 1b, the bundle of membranes 12 is potted at both ends in a header 14. The header comprises a cap 16 and a solid block of potting material 18, initially applied in a liquid or flowable state to surround the membranes 12 near their ends. For example, polyurethane or epoxy or another suitable adhesive material may be used. The potting material 18 seals the outer surfaces of the ends of the membranes 12 to the inside of the cap 16 to separate a liquid side outside of the membranes 12 from a gas side in, or in communication with, lumens of the membranes 12. The lumens of the membranes 12 are left open in at least one of the headers 14 to allow communication with a gas supplied to an inlet port 18 of the header 14. The lumens of the membranes 12 may be plugged in the other header 14, but are typically left open so that a gas may be introduced in one header 14 and removed from the other header 14. However, particularly in the case of pure gases such as oxygen or hydrogen, the gas may be introduced in one header 14, or into both headers 14, of the module 10 in a dead-end fashion with all of the input gas flowing through the walls of the membranes 12.

The membranes 12 may be in the range of about 3 m to 10 m long. Membranes 12 in the range of 5 m to 8 m long create modules 10 of about that height which, when installed with the membranes 12 generally vertical, coincides with the water depth of tanks often used in bioreactors for wastewater treatment. The header 14 could be cylindrical or rectangular. Cylindrical headers 14 often result in superior mechanical strength due to lower stresses on the wall of the cap 16. Rectangular headers 14 may allow for a denser assembly with other modules 10. A cylindrical header 14 may be in the range of about 2.5 to 10 cm in diameter, or in about the range of about 5 to 7.5 cm. The membranes 12 may be 200 microns or less, or 100 microns or less, for example in the range of 50-90 microns, in outer diameter. For example, a module 10 was constructed that was about 8 m high, with 7.5 cm diameter headers 14, 85 micron outside diameter membranes 12, potted at a packing density of 40% using polyurethane as the potting material. In this module, total fiber surface area was approximately 800 m2.

In operation, a biofilm can be supported and maintained on the membranes 12 at a high packing density. For example, the biofilm may occupy 40% or more, or up to about 70% or 80%, of the volume of a tank used to hold the water to be treated, one or more modules 10 and biofilm. Such a packing density is very high in comparison with a solid media attached biofilm process. A high packing density, in combination with high biofilm surface area, allows operation at high treatment rates.

The membranes 12 of each module 10 may be protected from damage during manufacturing and installation with a water soluble film or wrap. The wrap dissolves when the module 10 is immersed in water on site.

Figure 2:
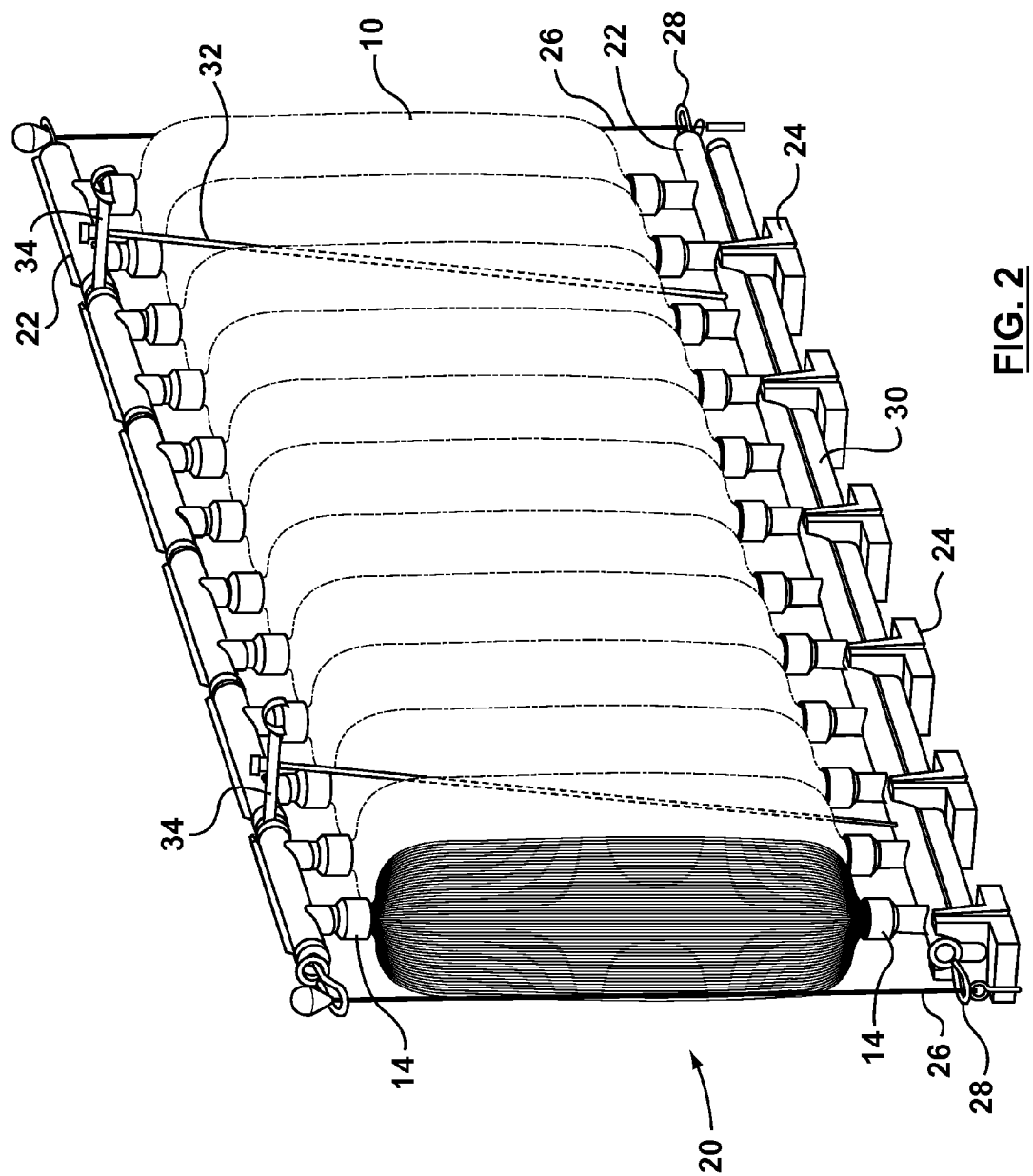
FIG. 2 is an isometric drawing of a removable cassette of the modules of FIGS. 1a and 1b.

Referring to FIG. 2, multiple modules 10 may be collected together into an assembly or cassette 20. The cassette 20 creates a movable unit that helps dispose multiple modules 10 in a tank. The cassette 20 may also be configured to permit efficient contact between wastewater and biofilm grown on the membranes 12. The cassette 20 may hold the lower headers 14 of a plurality of modules 10 near the bottom of a tank by gravity or by attachment to the tank or to a fixture near the bottom of the tank. The upper headers 14 of the modules 10 may be allowed to float or fixed relative to the lower headers 14. A cassette 20 with floating upper headers 14 may be easier to install and reduce stresses on the membranes 12 during tank level fluctuations. Floating upper headers 14 also help keep the bulk of the modules 10 submerged to avoid potential problems of freezing during winter.

Still referring to FIG. 2, the upper and lower headers 14 are connected together by upper and lower manifolds 22. The lower manifold 22 in FIG. 2 is connected to ballast weights 24 which keep the cassette 20 submerged in the tank during use. Straps 32 can be used to lower the cassette 20 into the tank or lift the cassette 20 out of the tank when desired. Cables 26 connected to the floor of the tank on either side of the cassette 20 can be used, by way of loops 28 attached to the lower manifold 22, to guide the motion of the cassette 20 during removal or replacement. The cassette 20 may be lifted out to repair or replace a module 10 or the entire cassette 20. The ballast weights 24 should be large enough to keep the lower manifold 22 near the bottom of the tank against the buoyancy of the membranes 12. An aerator 30 below the lower manifold 22 produces preferably fine bubbles, preferably uniformly distributed across the modules 10, to mix the water in the tank. Spacers 34 may be used to separate the manifolds 22 of adjacent cassettes 20.

Optionally, the straps 32 can be used to tie the upper and lower manifolds 22 together to create a floatable cassette. Lighter ballast weights 24 are then used to keep the lower manifold 22 below the upper manifold 22 without necessarily pulling the lower manifold 22 down to rest on the bottom of the tank.

In another possible configuration, the modules 10 are made without upper headers 14. The top ends of the membranes are not potted but are instead left open for exhausting gas after it has passed through the lumens of the membranes 10. In such a case, the un-potted membrane ends may be clamped and held in a floating form, for example made of a material such as polystyrene foam, to keep them above the water surface.

When disposed in a tank filled with water, the buoyancy of the membranes 12 interferes with providing a module 10 with a uniformly wide shape as shown in FIGS. 1a, 1b and 2. Instead, the tops of the membranes 12 tend to float beside the upper header 14. This in turn pulls the lower ends of the membranes 12 inwards. Thus the top part of the module 10 becomes too wide and open while the bottom part of the module 10 becomes too narrow and tightly packed. This results in non-uniform biofilm growth and poor penetration of the wastewater into the lower section of the module 10 which decreases biofilm surface area, process performance, loading rates and water distribution. To reduce these problems and promote a more nearly uniform distribution of the membranes 12, referring to FIGS. 3a and 3b, a spreader assembly 40 is used to distribute the membranes 12 near the bottom of the module 10. The spreader assembly 40 comprises a spreader plate 42, a plurality of collars 44 and a base 46. The base 46 snaps onto the lower manifold 22 and then the spreader plate 42 snaps onto the base 46. The collars 44 then snap into tie points 48 in the spreader plate 42. Each collar 44 is used to hold a subset of the membranes 12 of the module which were passed through the centre of the collar 44 before potting. The spreader plate 42 is installed within a module 10 after a cassette is assembled in the factory or at the wastewater treatment plant during installation. Although not shown, the spreader assembly 40 can be used with the modules 10 in the cassette 20 of FIG. 2 in a manner similar to that which will be described below in relation to FIG. 4.

Figure 4:
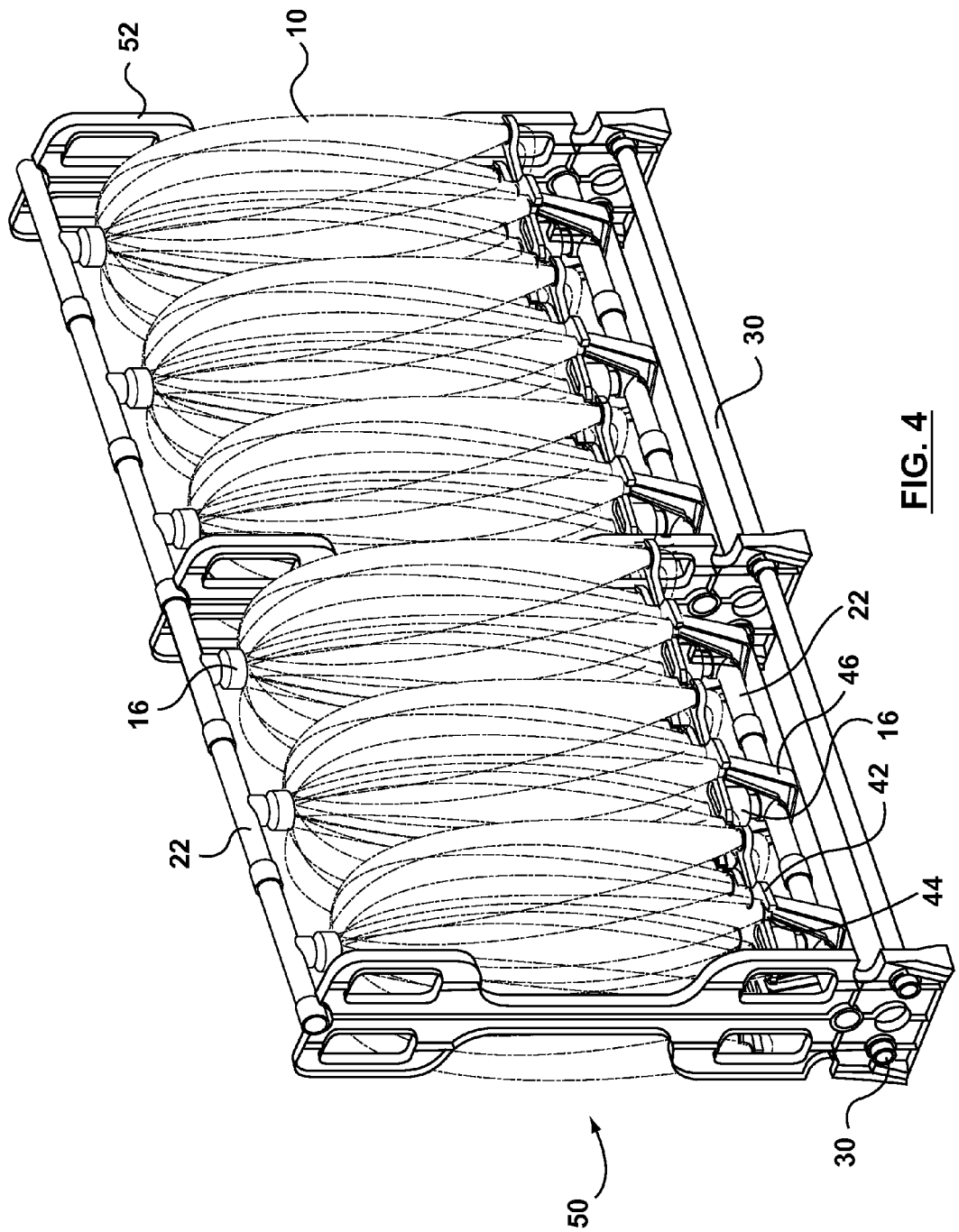

FIG. 4 shows an alternate cassette 50. The alternate cassette 50 uses many of the same components as cassette 20, as indicated by the use of the same reference numerals. The alternate cassette 50 is shown with spreader assemblies 40 installed to maintain the width of the bottom half of the modules. The alternate cassette 50 uses support frames 52 made of reinforced plastic which may be secured, permanently or removably, to the bottom of a tank. The support frames 52 hold the lower manifold 22 and a pair of aerators 30. The support frames 52 may also hold the upper manifold 22 but in the example illustrated the support frames only support the upper manifold 22. The upper manifold 22 may float upwards from the support frames 52 in use.

A cassette 20, 50 may hold other numbers of modules, for example 2 to 10. With a fixed or pre-selected membrane packing density of the modules 10, the spacing of the modules in the cassette 20, 50 can be varied to adjust the dry membrane packing density of the cassette. A larger number of modules 10 may be used in a cassette 20, 50 of fixed size to reduced module spacing and so increase dry membrane packing density. Adjusting the dry membrane packing density may allow for improved utilization of the tank volume. For a strong wastewater feed, a low dry membrane packing density of about 0.5% to 1.5%, or about 0.9% to 1% may be used since biofilm thickness tends to be high (100-250 microns) and so large biofilm packing densities can be achieved easily, resulting in high volumetric treatment rates. For low strength feeds, a high dry packing density of up to about 2 to 4%, or about 3%, may be used to ensure that a high wet or biofilm packing density can be obtained despite the thin biofilm which typically grows in low strength waste water. In a multi-stage reactor, a low dry packing density may be used in an initial stage, while a high dry packing density may be used in a latter stage, where wastewater strength is lower.

Cassettes may also be made in different geometries, such as rectangular, triangular, or in the shape of pentagon or hexagon, to suit tank geometry. A linear cassette is simple to fabricate, handle and install and can be adapted to different rectangular tank geometries by changing its length and number of modules. Triangular cassettes may more completely fill a cylindrical tank.

Figure 5:
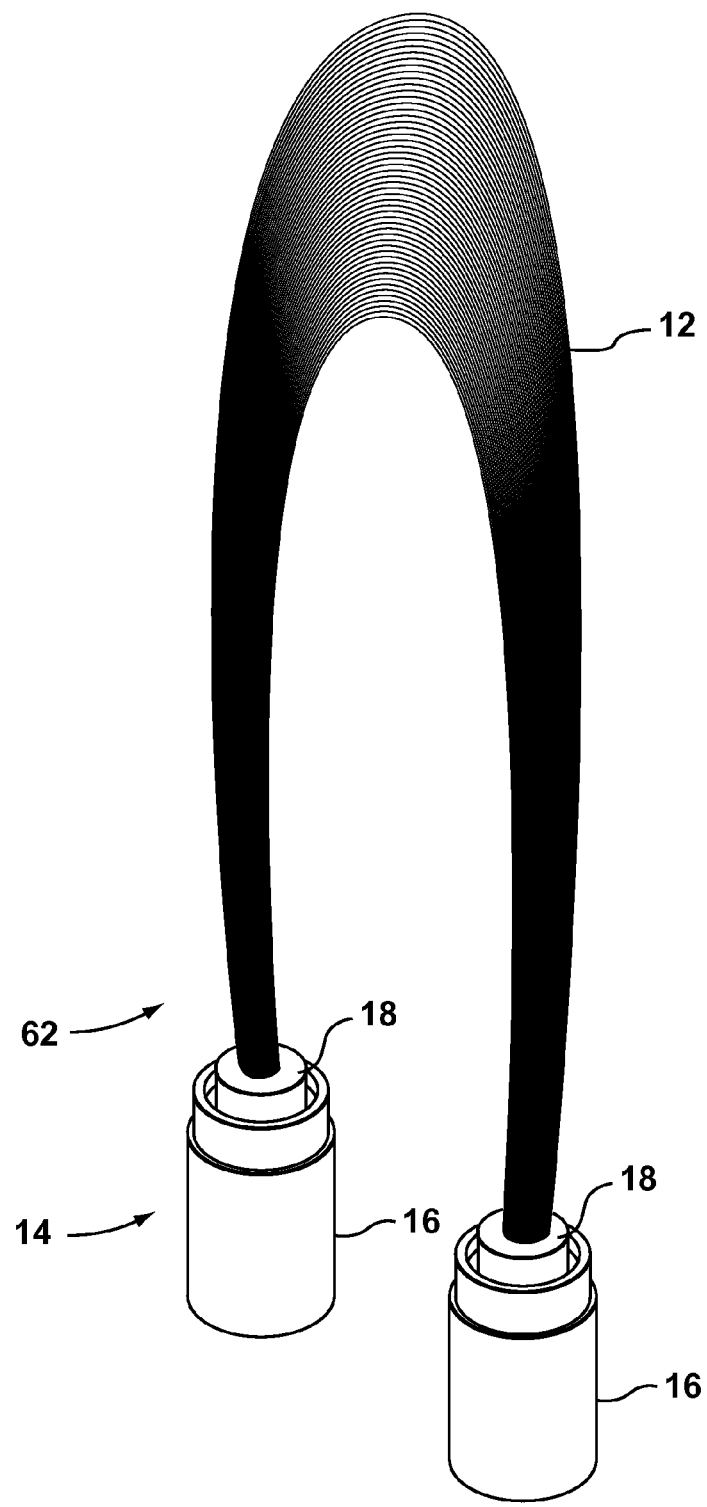
FIG. 5 is a schematic isometric drawing of an alternate module with a "∩" shape.

For shallow tank applications, cassettes may be made with long modules 62 that are placed in an inverted loop shape such that the top headers are eliminated, as shown in FIG. 5.

The supplies of gas to the aerator 30 and lower manifold 22 may be from one edge of the cassette 20, 50 using flexible tubing coming down from the top of the tank. The cassette components may be of molded plastic, such as PVC, CPVC, ABS, PP-GF20 or Norel®, the selection of material depending on the temperature and composition of the wastewater. Cassettes 20, 50 may be placed in a metallic frame with ballast, or attached to a fastener to the bottom of the tank. Another manifold for solids removal may also be supplied near the bottom of the tank. The solids removal manifold could alternatively be attached to the tank or connected to a cassette 20, 50. A gap may be provided between the mixing air manifold 30 and a solids removal manifold to provide space on the floor of the tank for solids to accumulate without getting entrained in the mixing air. Re-entrainment is usually undesirable as some of the solids may be retained in the biofilm, increasing biofilm packing density, which would then reduce the total treatment rates achievable in the process. The gap between the solids removal manifold and the mixing air manifold 30 may be 0.3 m or more.

Figure 6A:
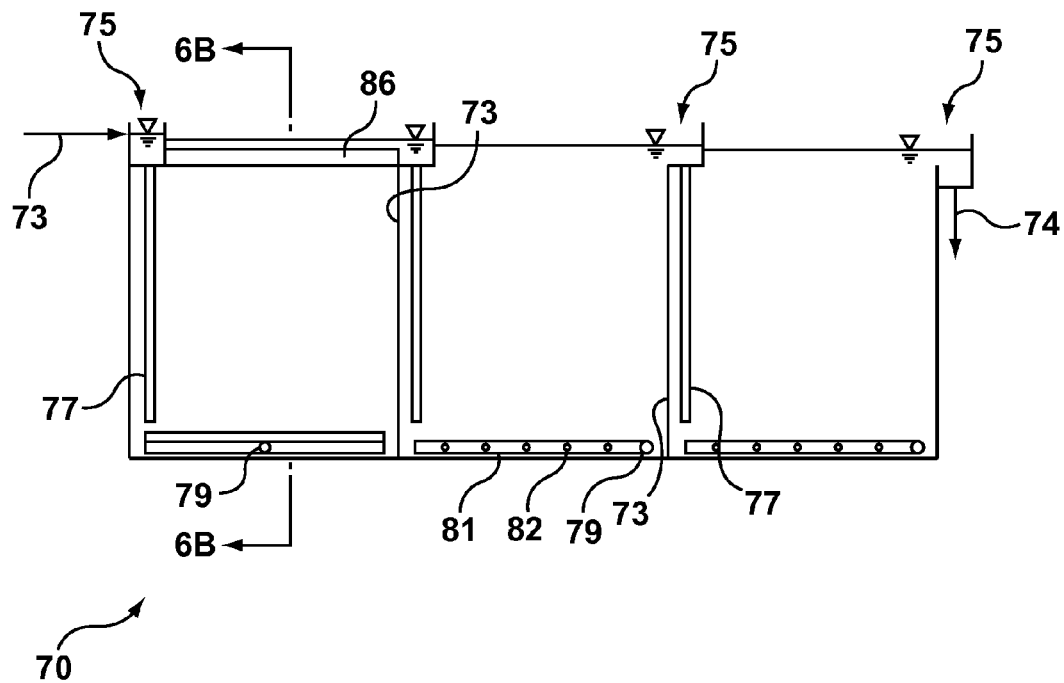
FIG. 6a is a schematic cross-sectional side view of a three stage tank.
Figure 6B:
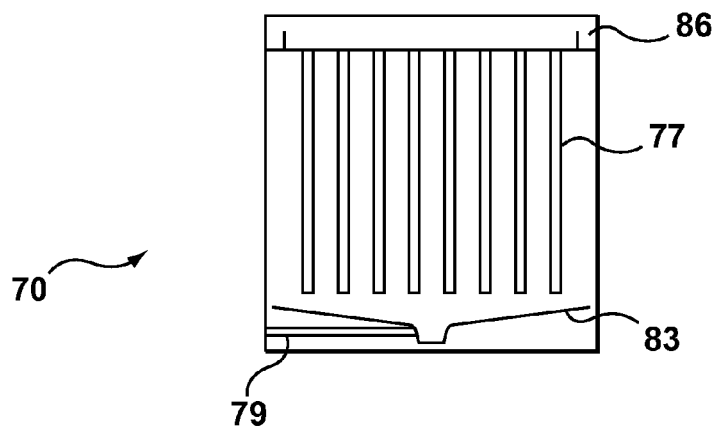

FIG. 6 shows a multistage tank 70. Cassettes 20, 50 may be installed in parallel in the tank 70, either perpendicular or parallel to the length of the tank. Three stages are shown, although a lower or larger number may be used depending on the effluent quality required. Each stage is operated in as near to plug flow conditions as possible, for example by ensuring that at least the top half of the tank is completely packed with fibers. Multi-staging reduces bypass, thus avoiding a significant degradation in effluent quality for high strength wastewater. A load bearing concrete wall or a non-load bearing baffle 73 may be used. Baffles may be made, for example, of a composite material such as fiber reinforced plastic, steel or wood. Pressure release valves may be provided in non-load bearing baffles 73 to avoid damage in the event of a sudden drop in level of one of the stages.

In general, liquid flow in a stage or tank may be from bottom to top, top to bottom or horizontal. In the tank 70 illustrated, wastewater flows upwards through a stage. Collection areas 75 is provided to collect wastewater from an inlet for flow to the first stage, from the end of one stage for flow to the next stage, or from the end of the last stage to an outlet 74. The first stage of tank 70 shows optional troughs 86 along the sides of the tank to help carry wastewater to the collection area 75. A set of feed channels 77, which are a series of pipes in the tank 70 illustrated, take the wastewater from the collection area 75 to the bottom of the tank 70 and distribute the wastewater across the width of the tank 70. A drain 79 may be provided in each stage of the tank 70 for solids removal or liquid recirculation. In the second and third stages of the tank 70, the drain 79 is connected to a sump pipe 81 with distributed sump openings 82. The first stage of tank 70 shows an alternate arrangement in which the drain 79 is connected to a drain baffle 83. Drain 79, sump pipe 81 and drain baffle 83 may optionally be located to pick up solids from the middle, a side or multiple locations within the tank 70. The second and third stages of tank 70 may be made like the first stage, or the first stage made be made like the second and third stages.

As the wet packing density of the biofilm is typically 40% or 50% or more, when a floating upper header 14 is used the upper manifold 22 will drop and rest on top of the biomass when the tank is drained. To ensure that the upper manifolds 22 stay parallel to each other, and rise without interference when the tank is refilled, spacers 34 as described previously with reference to FIG. 2 are provided connecting one manifold 22 with the next. Spacers may also be used to connect manifolds in series when the tank width is greater than the cassette length. Also, a railing 72 may be installed in the tank wall, or in the middle of the tank 70 in a suitable location, to support the upper manifold 22 if the tank is completely or partially drained.

Figure 7:
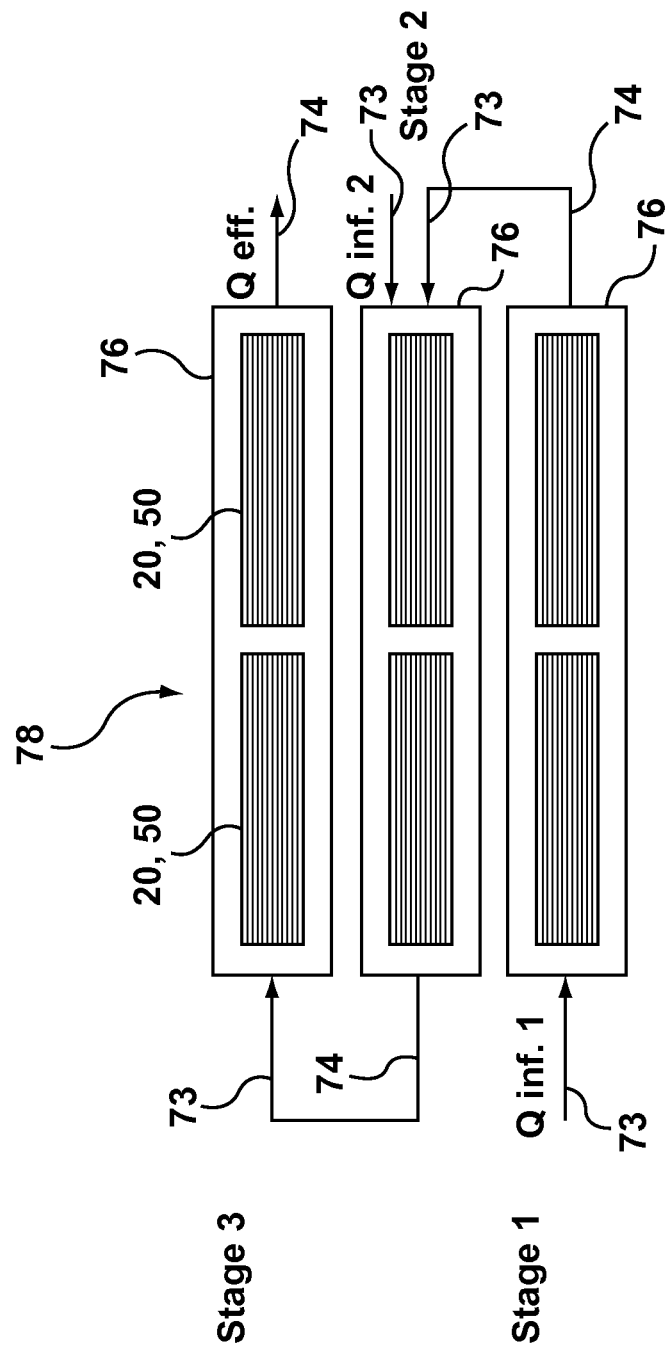
FIG. 7 is a schematic plan view drawing of a three stage reactor.

Alternatively, separate tanks 76 may be used as shown in FIG. 7. The tanks 76 in FIG. 7 have a high aspect ratio, for example 4 or more, to minimize baffling. Mixing zones may, however, be provided in between sections of the tank 76 to minimize potential bypass, particularly along the bottom of the tank. Immersed pumps may be used at intervals to pump the fluid from bottom of the tank 76 to the top, and may also be used for solids removal. Tank length to width ratio may depend on the strength of the wastewater, and other process requirements such as nitrification. Although tanks 76 may be used individually, they may also be connected by pipes to provide a multi-stage reactor 78.

Figure 8:
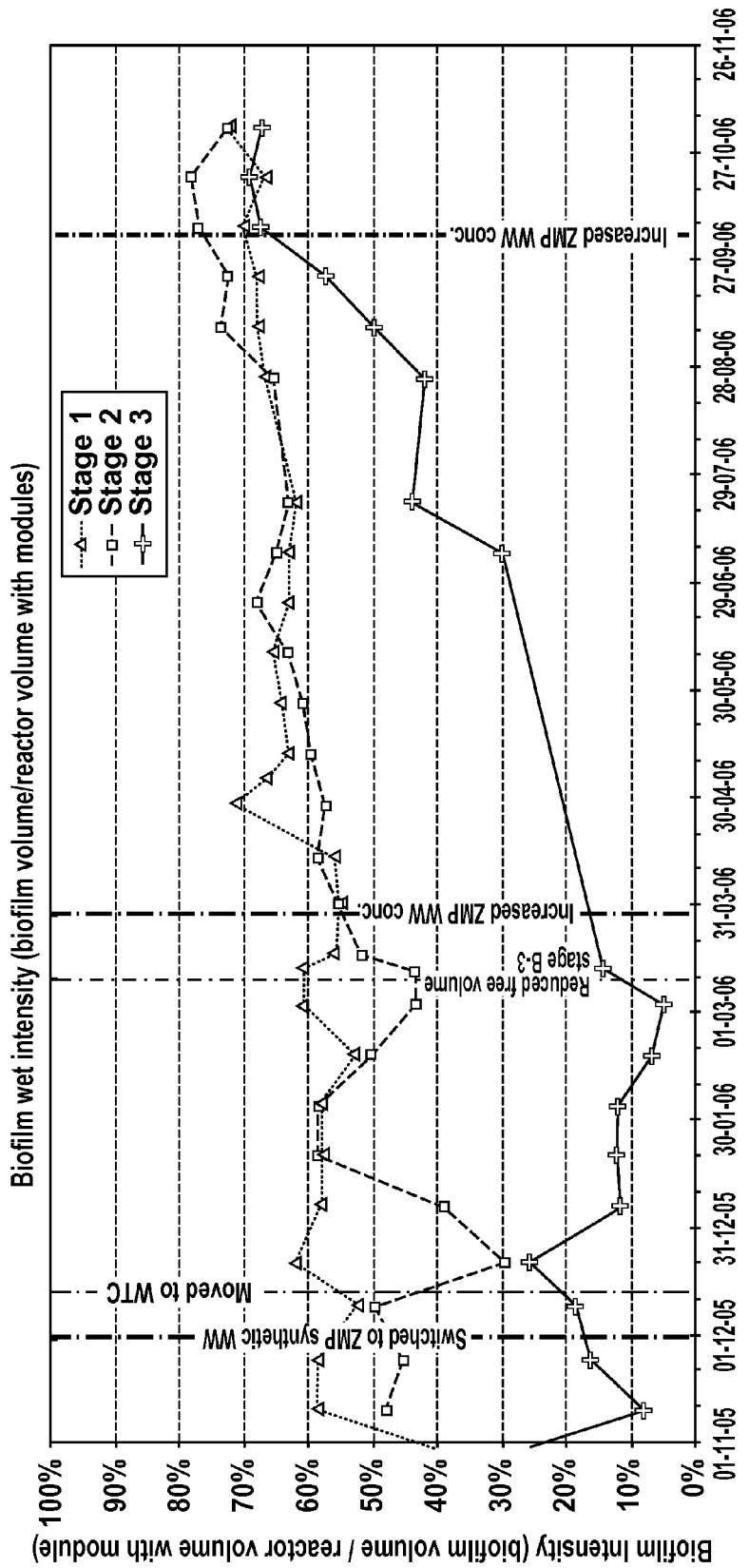
FIG. 8 is a graph of experimental results using a three stage system with varying membrane dry packing density.
Figure 9:
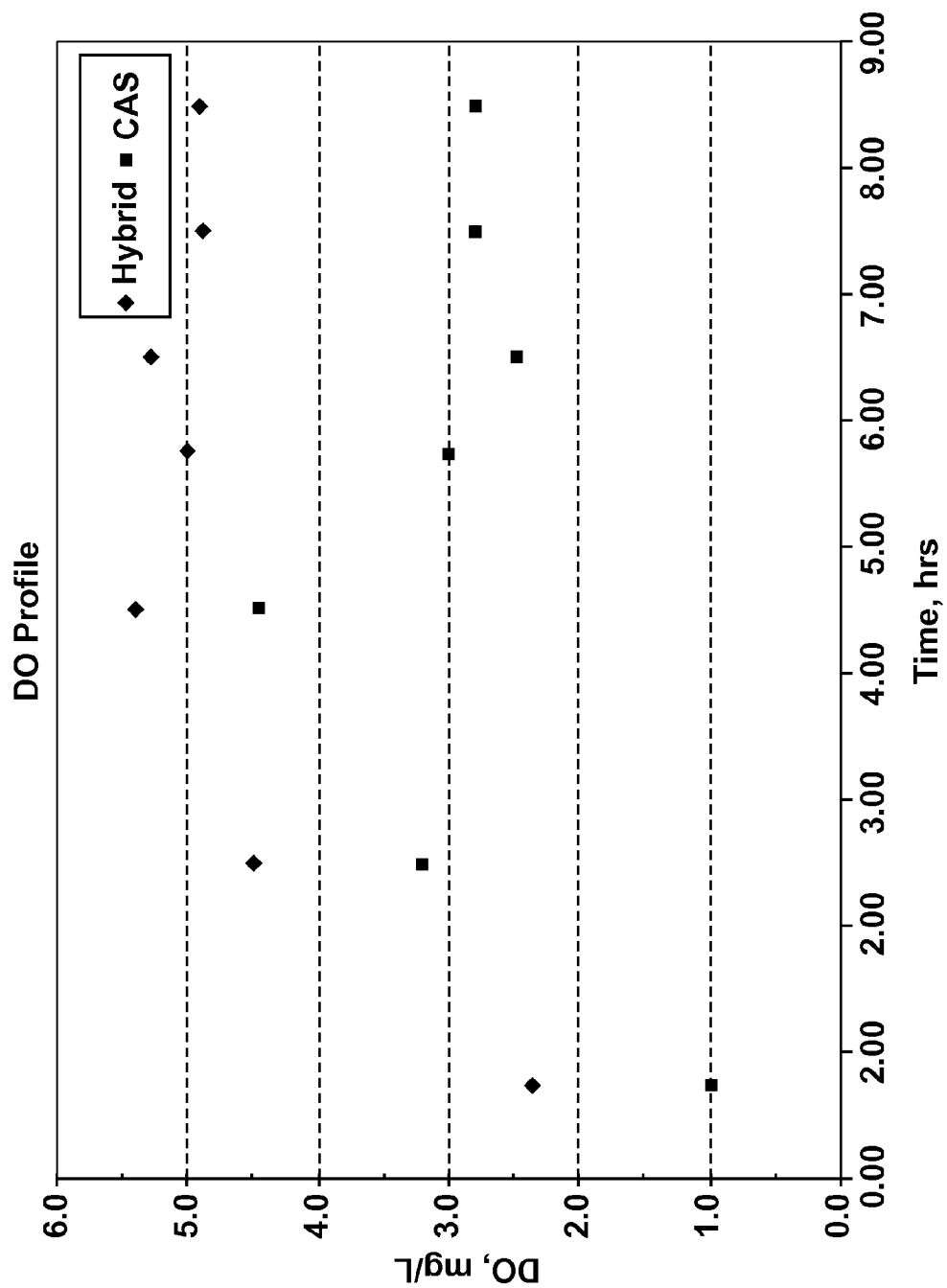
FIGS. 9 to 12 show concentration profiles for hybrid and conventional activated sludge systems during batch testing periods.
Figure 10:
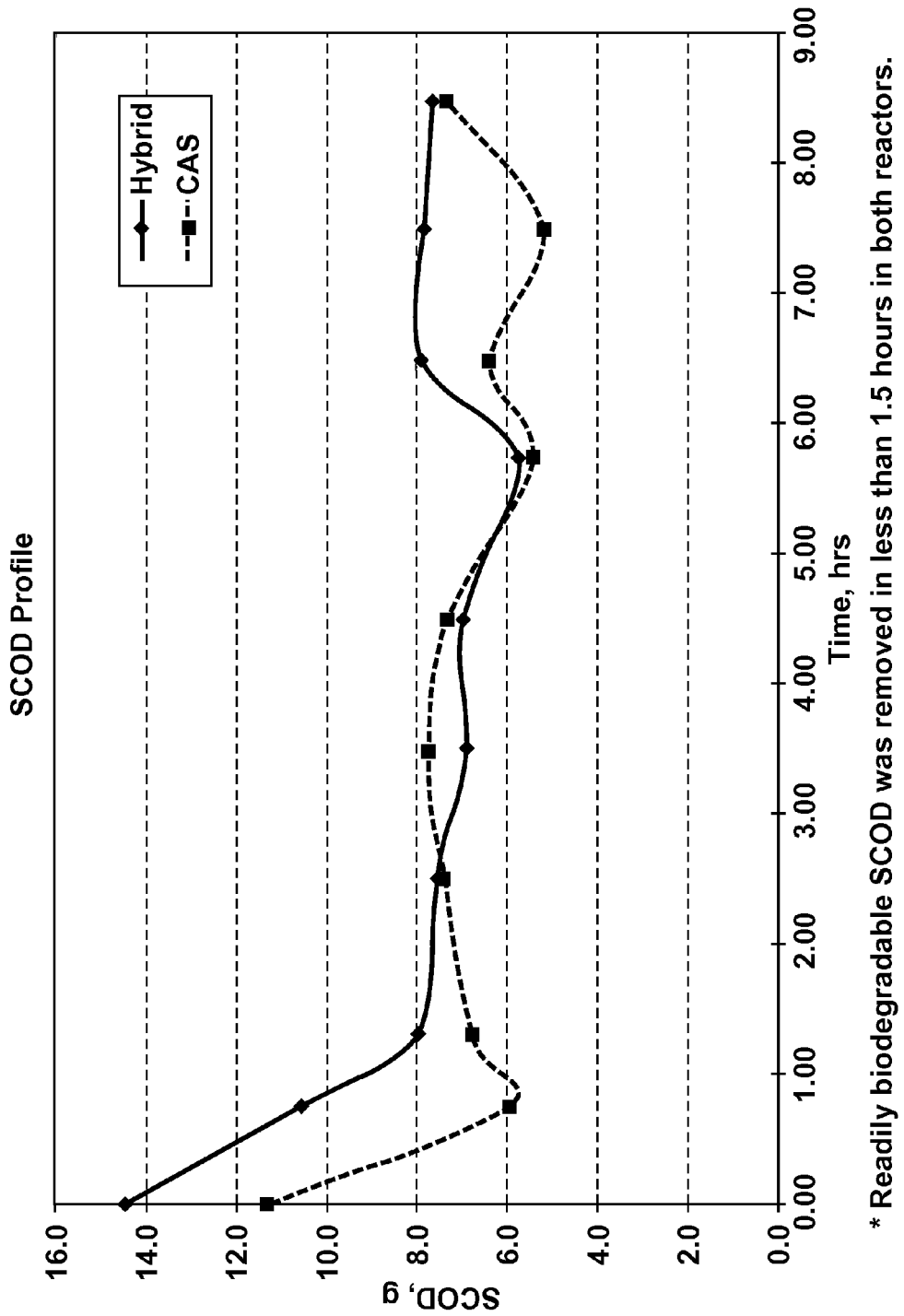
Figure 11:
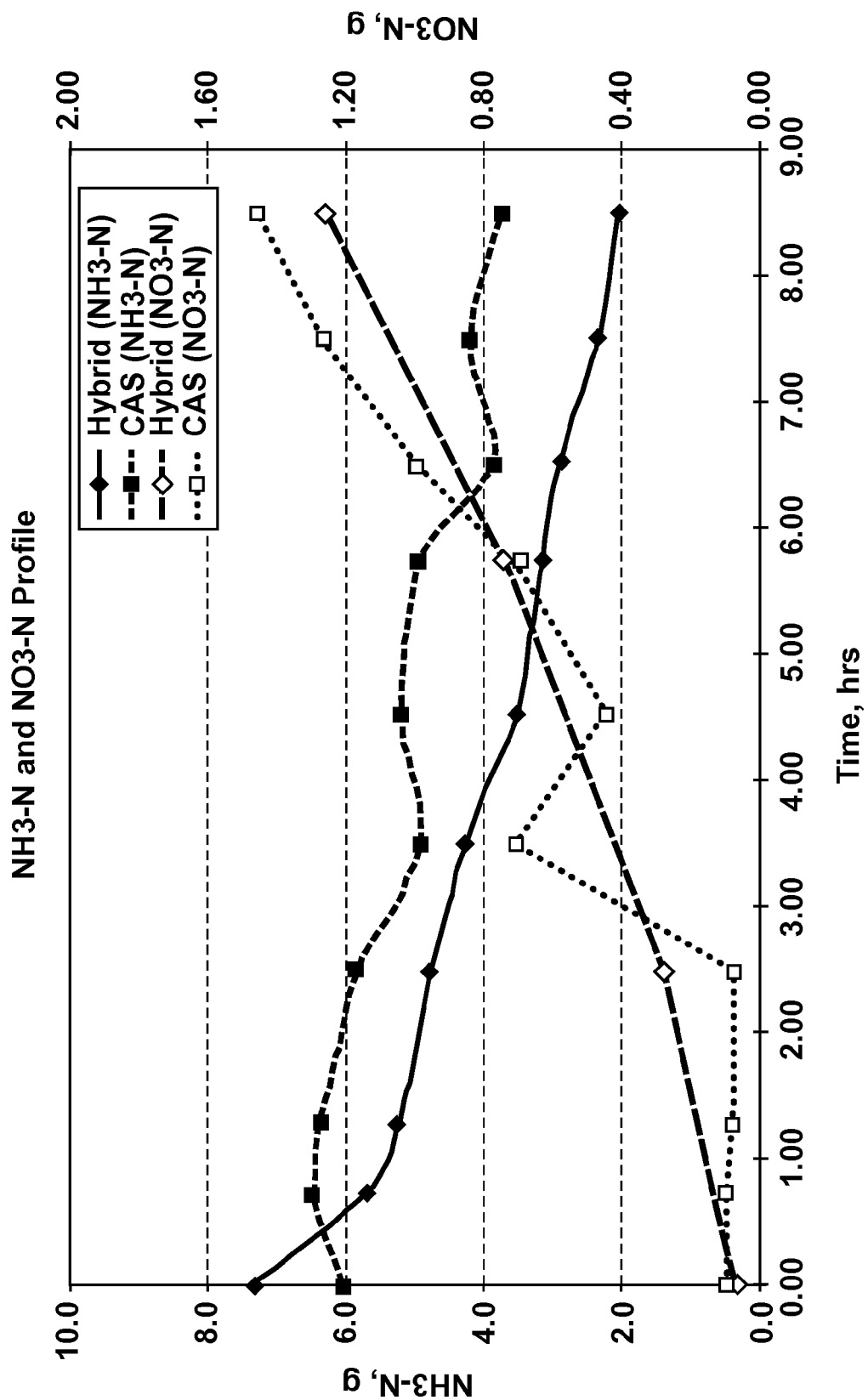
Figure 12:
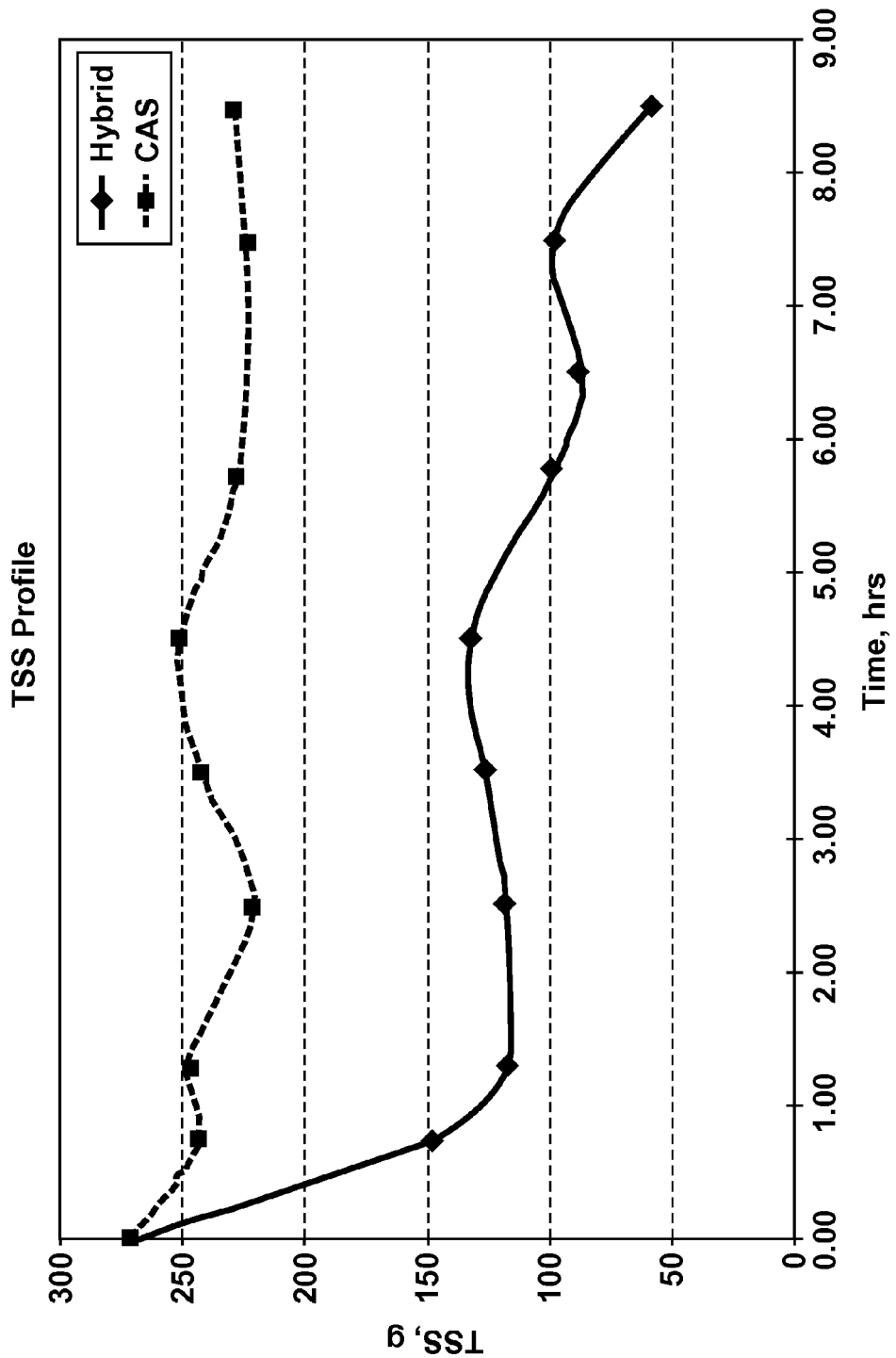

FIG. 8 shows the effect of increasing the dry packing density in the third stage of a three stage test unit. The third stage was originally at approximately 0.9% dry packing density. It was difficult to build up biofilm wet packing density (intensity) to beyond 10% which reduced process performance. The module was squeezed to increase its dry packing density by a factor of almost 2. The wet packing density doubled immediately. Afterwards, the wet packing density increased progressively to equal the other two stages, resulting in more efficient treatment.

Membrane Supported Biofilm Anoxic Process

Increasingly, nitrates, nitrites, perchlorate, arsenates, arsenites and other oxidized contaminants are becoming a serious problem in drinking water treatment, ground water remediation, and wastewater effluent discharge. In wastewater discharge applications, increasingly stringent total nitrogen limits are being imposed. An example is the Chesapeake Bay region, where very low nutrient limits must be met. Ground water contamination of perchlorates is a serious problem at many rocket propellants production sites. Presence of nitrates in groundwater is another problem that needs to be addressed.

A membrane supported biofilm reactor may be used to denitrify or implement other reduction reactions for the treatment of wastewater with oxidized contaminants such as nitrate, nitrite, perchlorate, arsenate, etc. To accomplish this, a hybrid biofilm is grown on the surface of the membrane having autotrophic microorganisms at the surface of the membrane and heterotrophic microorganisms at the biofilm surface. Autotrophic biofilm growth is achieved by introducing hydrogen in the lumen of the membranes 12, whereas a heterotrophic biofilm is grown by adding a carbon source to the wastewater. This approach offers benefits such as providing reduction with very low effluent organic carbon, oxidation reduction potential control, or alkalinity or pH control. Although the process may be implemented using any membrane configuration, the preferred configuration uses hollow fiber membranes 12 as described above. A very high biofilm surface area of over 1000 m2/m3 and a high wet packing density can be achieved in such a system, resulting in high volumetric treatment rates and very low sludge production.

The process is operated at a biomass concentration of over 10 g/L and up to about 30 g/L, which is high compared with 2-8 g/L biomass concentrations in conventional inert media systems. The process uses a biofilm surface area of 1000 m2/m3 or more which is high compared to the biofilm surface area of 100 m2/m3 in a conventional biofilm process. The process also avoids problems related to excessive build of calcium carbonate in the biofilm, which results in high level of inert material in the biofilm, in autotrophic biofilm systems.

The reactor and process described below provides a high level of reduction of oxidized impurities in water and wastewater with zero or negligible effluent chemical oxygen demand (COD) levels, a stable biofilm, low net sludge yield and high volumetric loading rates in a membrane supported biofilm system.

A rector may be made with fine hollow fiber membranes 12 with a maximum outside diameter of 200 or 100 microns. The hollow area of the membranes 12 may be 20-40%. The membranes 12 may be in lengths of up to 8 m, potted into modules 10 with their ends open in headers 14 at both ends as shown in FIGS. 1a and 1b. The modules 10 may be disposed in cassettes 20, 50 in a tank with a water level of up to 8 m and of any width and length as required by the total system capacity. A pipe is provided close to the bottom of the tank for solids withdrawal.

Hydrogen gas is supplied via the lower manifolds 22 to the lumens of the membranes 12. Hydrogen may be supplied, for example, by evaporating liquid hydrogen stored on site or by generating the hydrogen on-site, for example by electrolytic or hydrocarbon reforming.

Carbon dioxide may also be supplied to the lumens of the membranes 12 to control the pH of the autotrophic biofilm. Carbon dioxide may be generated on site, for example, by burning a hydrocarbon or by evaporating on-site stored liquid carbon dioxide.

A mixing system, such as the aerator 30, is used to periodically mix the water in the tank outside of the membranes 12. Since hydrogen may be present in the water, air is not supplied to the aerator. The tank may be topped with a lid to collect gases for recycling to the aerator 30. Alternatively, pumps may be used to recirculate the water.

A multi-stage tank 70 is used, typically consisting of three stages. The tank 70 has channels 71 at the front of each stage for feed dispersal, and collection areas 75 at the end of each stage or along the sides for collecting effluent. Ancillary systems are provided to supply wastewater feed and to remove treated water, to remove solids from the bottom of the tank and to recirculate effluent to the feed channels if necessary.

A biofilm is first grown on the surface of the membranes 12 under batch conditions, in which a solution with high COD and nitrate is fed to the tank 70 and hydrogen gas is supplied to both headers 14 of the modules 10. Typically, three to six weeks are required to grow the biofilm required to achieve the desired capacity.

Continuous system feeding then starts, with progressive growth of the biofilm measured as wet packing density, which represents the volume of the biofilm divided by the volume of the reactor. The feed may be introduced into the first stage only, or may be split between first and second stages as shown in FIG. 7, with the second stage receiving feed in the range of 10-30% of the total flow. The objective is to obtain uniform biofilm distribution in the first and second stages.

A COD source, which may consist of methanol, glucose, or any other non-recalcitrant organic carbon source, is added to the feed. The preferred ratio of COD/N is about 3:1, although it can be in the range of 2-4:1. Hydrogen pressure may be maintained in the membrane 12 lumen from both headers. ORP is measured and maintained in the range of 50 to −400 mV, or in the range of 0 to −100 mV.

Gases captured at the top of the tank 70 are introduced at a flow rate, which may be 10-20% of the specified flow rate of the fine bubble aerator 30 used, to the aerator 30 periodically using a blower which withdraws its feed from the top of the tank 70. The objective of this is to disperse the water throughout the modules 10, and to remove some of the biosolids shed by the biofilm to help achieve a stable biofilm wet packing density. The frequency of mixing may range from 10-30 seconds every 3-10 minutes, or form 10-20 seconds every five minutes.

The solids accumulated at the bottom are periodically removed, for example at a frequency of once a day to once every 30 days, but preferably once a week.

Tests were conducted on a batch test unit to simulate a plug flow continuous process. The reactor characteristics and typical operating conditions are presented in Table 1.

TABLE 1

Reactor Summary

| Parameter | Unit | |
|---|---|---|
| Total reactor volume | L | 5.3 |
| Inlet hydrogen pressure | psig | 3 |
| Fibre OD/ID | um | 50/30 |
| Fibre area | m2 | 1.48 |
| Number of fibres | | 19200 |
| Number of tows | | 400 |
| Fibre length | m | 0.49 |
| Mixing type | | Liquid recirculation |
| Recirculation flow rate | L/h | 30 |

Two test units were operated, one with hydrogen to the lumens of the membranes 12 and the other without hydrogen to evaluate the performance of a combined autotrophic and heterotrophic biofilm. These tests were performed at different COD/NO3-N ratios, at N concentrations that were similar in the reactors with and without hydrogen. The results are shown in Table 2. Common parameters were a hydrogen pressure of 1.5 psi, a biofilm wet packing density of 5.5%, and glucose as the COD source.

TABLE 2

Batch test results

| COD/NO3—N ratio | Parameter | With H2 (1.5 psig) (Hybrid autotrophic/ heterotrophic) | | | Without H2 (heterotrophic only) | | |
|---|---|---|---|---|---|---|---|
| | | 0 h | 3 h | 6 h | 0 h | 3 h | 6 h |
| 4 | ORP (mV) | −100 | | −299 | −12 | −180 | −85 |
| | NO3—N (mg/L) | 203 | 12 | 5 | 100 | 23 | 12 |
| | COD (mg/L) | 810 | 240 | 380 | 400 | 260 | 190 |
| 3 | ORP (mV) | −63 | −190 | −252 | 67 | 28 | −44 |
| | NO3—N (mg/L) | 115 | 20 | 9 | 107 | 38 | 16 |
| | COD (mg/L) | 317 | 80 | <10 | 291 | 373 | 131 |
| 2 | ORP (mV) | −7 | −147 | −168 | 127 | 50 | 67 |
| | NO3—N (mg/L) | 113 | 25 | 12 | 110 | 53 | 40 |
| | COD (mg/L) | 189 | <10 | <10 | 194 | 18 | <10 |

Of particular note are the results at a COD/NO3-N ratio of 3. More than 90% NO3-N removal was achieved in six hours with effluent COD of less than 10 mg/L. However, without hydrogen (the heterotrophic system), significant residual COD was present, while removal of nitrogen was poorer. Similar results were obtained with a COD/N ratio of 2. While no COD was observed in both systems after six hours, the degree of denitrification in the hybrid system was superior to the heterotrophic system.

For the reduction of oxidized contaminants, negative ORP should be maintained. Negative ORP profiles were obtained for the hybrid process at a COD/N ratio of 2 while a COD/N ratio of 4 was needed for the heterotrophic process in order to get a negative ORP profile. The hybrid system was able to achieve excellent denitrification and oxidized contaminant reduction at a lower COD/N ratio than the heterotrophic system, with zero or negligible residual COD in the process effluent.

Membrane Supported Biofilm Process for Municipal and Industrial Wastewater Treatment A membrane supported biofilm reactor as described above may be used to treat wastewater, for example municipal or industrial wastewater. Modules 10 may be used with the membranes 12 occupying up to 3% of the bioreactor volume. The system may be operated at a high biomass concentration of over 10 g/L or 20 g/L and up to about 40 g/L, compared with only 2-8 g/L in conventional systems. The biofilm surface area may be over 1000 m2/m3, compared about 100 m2/m3 for fixed media biofilm processes. This results in a very low true sludge yield of less than about 0.1 g TSS/g CODt loading compared with about 0.3 g TSS/g CODt for fixed media biofilm systems. A high volumetric treatment rate of about 2-4 kg CODt/m3 of reactor volume/d may be achieved which reduces system costs and helps provide a stable biofilm over long periods of operation. A high oxygen transfer efficiency of 50-90% can be achieved, compared to 10-20% in conventional processes, with negligible foaming even with industrial effluent with high foaming characteristics. The high oxygen transfer efficiency and low sludge production reduce energy costs for biofilm control, the cost of sludge disposal and environmental problems associated with sludge disposal.

The membranes 12 themselves occupy only a small part of the reactor volume, leaving the bulk of the reactor volume available for biomass growth. The biofilm can occupy as much as 80% of the reactor volume, particularly with high concentration industrial wastewater streams. The resulting high biofilm surface area leads to uniform biomass shedding by the biofilm. A combination of high biomass concentration and surface area permit maintaining a stable biofilm and steady state operation even at high volumetric treatment rates, combining the benefits of relatively small bioreactors and low sludge disposal cost.

A system may use modules 10 generally as described above. The membranes 12 may have a hollow area in the range of about 20-80%, be in lengths of up to about 8 m, and be potted in open headers 14 at both ends. An assembly of hollow fiber modules 10 is disposed in a tank with a water level of up to about 8 m and of a width and length as required by the total system capacity. Lower and upper manifolds 22 are used to supply and withdraw oxygen bearing gas from the modules 10.

A pipe close to the bottom of the tank is used for solids withdrawal. A mixing aerator, preferably of a fine bubble design, is provided above the solids withdrawal pipe and is disposed uniformly along the width of the assembly of modules 10. A multi-stage system, in which the process tank is divided in sections, for example consisting of three stages as shown in FIG. 6 or 7, may be used. The process tank may have channels at the front of each stage for feed dispersal, and baffles at the end of each stage or along the sides for collecting effluent. Ancillary systems are provided to supply wastewater feed and to remove treated water, to supply an oxygen bearing gas such as air to the module, supply air for mixing to the bottom aerator, remove solids from the bottom of the tank and to recirculate the system effluent to a feed channel.

A biofilm may be first grown on the surface of the membranes 12 under batch conditions in which a solution with high COD is fed to the tank and air is supplied to one of the manifolds 22. Typically, three to six weeks are required to grow a biofilm of adequate size to achieve a desired capacity. After this start up period, the batch conditions are replaced with continuous system feeding. The biofilm continues to grow, as indicated by measurements of wet packing density which represent the volume of biofilm per unit volume of the reactor. The feed may be introduced into the first stage, or be split between first and second stages, with a second stage receiving in the range of 10-30% of total flow as indicated in FIG. 7. The objective is to obtain a generally uniform biofilm distribution in the first and second stages.

For low concentration feeds, for example between about 500 mg/L CODt and 2000 mg/L CODt, the total biofilm wet packing density is maintained in the range of 30-50%. For stronger wastewater feeds of over 2000 mg/L CODt and up to 10,000 mg/L CODt, the biofilm wet packing density is allowed to grow to over 50% and up to about 80%. To the inventors' surprise, it has been possible to operate the system at this very high biomass concentration while maintaining excellent removal of COD, BOD5, ammonia, total nitrogen, Kjeldahl's nitrogen and other contaminants even at these very high biofilm concentrations.

After the biofilm reaches its desired size, the system is operated at an F/M ratio of 0.1 to 0.2 g CODt/g Total Biofilm Solids/d, for example at 0.14-0.16. Air is introduced to the bottom aerator 30 in a periodic manner. The objective of this aeration is to disperse the liquid throughout the module 10 and to remove some of the biosolids shed by the biofilm to help achieve a stable biofilm wet packing density. The frequency of aeration may range from 10-100 seconds every 3-240 minutes, typically 10-20 seconds every five minutes. The solids accumulated at the bottom of the tank are periodically removed, for example at a frequency between once a day to once every 30 days, or about once a week.

For very concentrated feeds, the effluent may be recycled to maintain more vigorous hydraulic conditions that promote shedding of the biofilm. Recycling may also be used to achieve a desired inlet concentration, for example in the range of 500-5000 mg/L CODt or in the range of 1500-5000 mg/L CODt.

In cases where the system is exposed to an excessive load, rapid biofilm growth may occur. In such a case, the biofilm may be reduced by one or more of various procedures. In one procedure, air is introduced from the aerator 30 at an increased flow rate compared to the normal mixing flow rate for up to one hour. This releases solids from the biofilm. In another procedure, the recirculation rate is increased to up to 20 times the feed flow rate for a period of up to one hour. If a separate recirculation system is not present, the solid removal system may be used to withdraw liquid from the bottom of the tank and recirculate it to the top of the same stage. In another procedure, sodium nitrate is added to the feed at a concentration of up to 500 mg/L, for example about 100 mg/L, to generate nitrate gas close to the surface of the biofilm. This increases the rate of biofilm stripping from the surface of the biofilm. In another procedure, aeration is stopped once the biofilm is able to treat wastewater effectively. Mixing to provide adequate contact between biofilm and substrate is provided instead by recirculation or intermittent feeding at higher velocity through evenly distributed feed channels. The resulting biofilm is more fragile than a biofilm which grows in the presence of mixing by aeration. Aeration may then be used from time to time to remove biofilm. One or more of these procedures may be used from time to time or as required to keep the biofilm below a desired maximum biofilm wet packing density. After a biofilm removal procedure, removed solids may be allowed to settle for up to about 30 minutes and the solid removal system may be used to withdraw liquid with entrained solids from the bottom of the tank.

Various tests were conducted on two bench scale units, A & B. The bench scale reactors were run in parallel with top to bottom continuous feed flow. The main difference between the systems was the type of mixing. Unit A was operated with mixing from fine to medium bubble diffusers and Stream B was operated with baffle mixing. A system overview and the main module operating conditions are outlined in Table 3.

TABLE 3

Bench System Overview and Module Operating Conditions
Bench Scale Reactor Information

|  | units | Stream A | Stream B |
|---|---|---|---|
| Reactor Volume | L | 17.2<br>Stage 1: 5.3<br>Stage 2: 5.3<br>Stage 3: 6.6 | 19.6*<br>Stage 1: 6.5<br>Stage 2: 6.5<br>Stage 3: 6.6* |
| Inlet Air Pressure | psi | 6 | 6 |
| Fibre OD/ID | um | 50/30 | 50/30 |
| Fibre area | m2 | 10.0 | 10.0 |
| Number of fibres |  | 115200 | 115200 |

TABLE 3-continued

Bench System Overview and Module Operating Conditions
Bench Scale Reactor Information

|  | units | Stream A | Stream B |
|---|---|---|---|
| Number of tows |  | 2400 | 2400 |
| Fibre length | m | 0.48 | 0.48 |
|  |  | (stage 3: 0.67) | (stage 3: 0.67) |
| Mixing type |  | fine-medium bubble diffuser (no mixing stage 3) | Baffle mixing (no mixing stage 3) |
| Mixing intensity | scfh | 5 | 5 |
| Mixing frequency | on/off | 10 sec/5 minutes | 10 sec/5 minutes |

*Reactor volume is 16.6 L after Mar. 10, 2006 when the 3$^{rd}$ stage free volume was reduced to 3.6 L A pilot unit was also built to demonstrate the ability to treat industrial wastewater. This pilot was commissioned in January 2006 and operated with synthetic wastewater for 5 months to begin biofilm growth. The pilot was then moved to an industrial site in September 2006 to continue the testing with actual industrial wastewater.

Table 4 lists some of industrial wastewater's parameters since Sep. 27, 2006. The source water has a high range of COD and a low range of T-P and TSS. High-strength glycerin and NMP dumps, which occur regularly but infrequently in the plant, are the main contaminants of the wastewater. The addition of the P-source is inevitable in the biological process for this type of water. Potassium phosphate is added to keep C:N:P ratio around 100:5:0.3.

TABLE 4

Characteristics of target industrial wastewater, Sep. 26-Oct. 27, 2006.

| Parameters | Wastewater (average) |
|---|---|
| CODt, mg/L | 10450 |
| TSS, mg/L | 4 |
| TKN, mg/L | 461 |
| Nitrate-N, mg/L | 3 |
| T-P, mg/L | 16 |
| Alkalinity, mg/L as CaCO$_3$ | 23 |
| pH | 5.3 |

The main elements of the pilot were a process tank, wastewater feed, air supply and modules 10. A three stage reactor was uses generally a shown in FIGS. 6 and 7. The Table 5 shows the main properties of the modules 10. The 3-stage system was operated with a split feed condition and each stage was monitored as an independent process. A programmable logic controller was employed to control the pilot operation as well as to continuously log data during the test.

The module 10 had dimensions of 1275×800×200 mm$^3$ (H×L×W). The membranes 12 were made of poly-methylpentene (PMP) with an ID of 44 μm, OD of 60 μm and a hollow area of 54.3%. The total reactor volume was 1610-liter provided by a 1235×1680×776 mm$^3$ (H×L×W) stainless steel rectangular tank internally divided into three stages.

TABLE 5

Properties of pilot plant
Pilot Information

|  | Units | Tank A | Tank B | Tank C |
|---|---|---|---|---|
| Reactor Volume | L | 570 | 570 | 470 (670*) |
| Inlet Air Pressure | Psi | 5/8 | 5/8 | 5/9 |
| Fibre OD/ID | Um | 60/44 | 60/44 | 60/44 |
| Fibre area | OD m2 | 364 | 364 | 404 |
| Number of fibres | # | 1296000 | 1296000 | 1440000 |
| Number of tows | # | 27000 | 27000 | 30000 |
| Fibre length | M | 1.49 | 1.49 | 1.49 |
| Mixing type |  | fine bubble diffuser | | |
| Mixing intensity | scfh | 60 | 60 | 40 |
| Mixing frequency** | on/off | 10 sec/5 minutes | 10 sec/5 minutes | 10 sec/5 minutes |

*After March 29

In one test, bench scale test unit A was operated from Nov. 1, 2005 to Mar. 6, 2006. The influent CODt was 1620 mg/L. The influent volumetric loading rate was 2.78 kg CODt/m3 bioreactor volume/d. The influent Total Kjeldahl's nitrogen (TKN) was 89 mg/L. There was only one feed to the first stage. The biofilm wet packing density was determined by a displacement method and expressed as the average of the three stages. The biofilm was stable throughout the test period at a wet packing density of about 33%. The treatment rate was 2.5 kg (CODt-CODs)/m3 of reactor volume/day. The F/M ratio was 0.14 g CODt/day/g total biofilm solids. The COD removal was over 85%. Total nitrogen reduction was over 36%.

In another test, test unit A was operated from Mar. 6, 2006 to Jul. 31, 2006. Influent CODt was 4175 mg/L. Influent volumetric loading rate was 2.9 kg CODt/m3 bioreactor volume/d. Influent Total Kjeldahl's nitrogen (TKN) was 138 mg/L. Approximately 90% of the feed went to the first stage while about 10% went to the second stage. The biofilm was stable at a wet packing density, determined by a displacement method and expressed as the average of the three stages, of 47%. Treatment rates were 2.8 kg (CODt-CODs)/m3 of reactor volume/day. The F/M ratio was 0.14 g CODt/day/g total biofilm solids. Over 90% of the COD was removed. The total nitrogen reduction was over 70%.

In another example, the test unit B was operated from Nov. 1, 2005 to Mar. 6, 2006. The influent CODt was 1620 mg/L. The influent volumetric loading rate was 2.9 kg CODt/m3 bioreactor volume/d. The influent Total Kjeldahl's nitrogen (TKN) was 89 mg/L. All of the feed was sent to the first stage. The biofilm was stable at a wet packing density, determined by a displacement method and expressed as an average of the three stages of 40.8%. The treatment rate was 2.68 kg (CODt-CODs)/m3 of reactor volume/day. COD treatment was over 85%. Total nitrogen reduction was over 40%. The F/M ratio was 0.13 g CODt/day/g total biofilm solids. Net sludge production was less than 0.05 g TSS/g CODt.

In another example, test unit B was operated from Mar. 6, 2006 to Oct. 31, 2006. Influent CODt was 5190 mg/L. Influent volumetric loading rate was 4.1 kg CODt/m3 bioreactor volume/d. Influent Total Kjeldahl's nitrogen (TKN) was 176 mg/L. Approximately 90% of the feed was fed to stage one and approximately 10% was fed to stage two. The biofilm wet packing density, determined by a displacement method and expressed as an average of the three stages, increased during the test period from 47% to 72% and was approaching a stable condition. The treatment rate was 3.9 kg (CODt-CODs)/m3 of reactor volume/day. The COD treatment was more than 85%. Total nitrogen reduction was over 70%. The F/M ratio was 0.14 g CODt/day/g Total Biofilm Solids. The net biomass generation was less than 0.05 g TSS/g CODt. This example suggests that a 4.1 kg CODt/m3 of bioreactor volume/d was near the limit of stable operation for this test. A wet packing density of 72% could be acceptable for high concentration waste streams, indicating that loading rates as high as 3 or 4 kg CODt/m3/d or more are feasible with this reactor. The net sludge production remained very low even at this loading.

In another example, the pilot reactor was operated from Apr. 6, 2006 to Jun. 1, 2006 at a CODt-CODs treatment rate of 3.5 kg/m3/d, increasing to 4.8 kg/m3/d. Because of the rapidly increasing treatment rate, the wet packing density in the first stage increased from 43% to 64%.

Membrane Supported Biofilm Hybrid Process for Treatment of Wastewaters with High Suspended Solids A hybrid bioreactor may be provided by installing a membrane supported biofilm module in a suspended growth reactor and maintaining a suspended biomass in the tank outside of the membrane supported biomass. An oxygen containing gas is fed to the insides of the membranes. Oxidation and reduction reactions take place in the biofilm and in the suspended biomass to provide a high degree of treatment. The hybrid reactor may be used to treat industrial and municipal wastewaters, particularly wastewater with a high suspended solids concentration. The hybrid reactor may be useful for treating complex waste stream and may provide high treatment rates, good effluent quality, high oxygen transfer efficiency and low sludge production. High levels of reduction of one or more of chemical oxygen demand (COD), ammonia, organic nitrogen, or other impurities in water and wastewater may be provided at high oxygen transfer efficiencies with stable biofilm, low net sludge yield and high volumetric loading compared to a conventional suspended growth processes.

A system may have modules 10 in cassettes 20, 50 as described previously above. Alternately, the modules 10 may have membranes 12 woven with inert fibers into a sheet. The membranes 12 may have a hollow area of 20-40%. The modules 10 are disposed in a tank, for example with a water level up to 8 m and of a width and length as required by the total system capacity. The length of the membranes 12 may be near the water level such that the membranes 12 span most of the depth of the water being treated. Air, or another oxygen bearing gas, is supplied to a lower manifold 22 and withdrawn from an upper manifold 22. A pipe close to the bottom of the tank is provided for solids withdrawal.

The modules 10 are installed in a suspended growth reactor. Oxygen is supplied to the lumens of the membranes 12, for example by way of supplying a flow of air. A mixing system, for example a fine bubble gas diffuser using aerators 30, is used to keep the suspended biomass in a state of substantial suspension. A single or multi-stage system, for example having one to three stages, may be used as shown in FIG. 6 or 7. The tanks may have channels 71 at the front of each stage for feed dispersal, and collection areas 75 at the end of each stage, or along the sides of each stage, for collecting effluent and passing the effluent to the next stage, to recycle or to a waste stream. Ancillary systems are provided to supply wastewater feed, to remove treated water, to remove solids from the bottom of the tank and to recirculate the system effluent to a feed channel if necessary.

To start the process, a biofilm may be first grown on the surface of the membranes 12 under batch conditions in which a solution with high COD and nitrate is fed to the tank and hydrogen gas is supplied to both manifolds 22. Typically, three to six weeks are required for a biofilm to grow to a desired size. A suspended biomass is then introduced in the reactor and aeration, and additional mixing if required, is started on a continuous basis to keep the biomass in suspension. Continuous system feeding then starts and the growth of biofilm is measured, for example as wet packing density by dividing the volume of the biofilm by the volume capacity of the reactor. The feed is introduced into the first stage along with recycled sludge containing biomass. An anoxic stage may be provided upstream of the hybrid reactor to remove nitrates present in recycled sludge using digestible COD in the feed.

Biomass is removed from the reactor effluent by a separation unit, for example a separation membrane or a clarifier. Clarified effluent is discharged to the next unit process. Separated biomass is sent back to the front of the reactor. Excess solids may be removed, for example from the recycle line.

A system and process as described above and in Tables 6 and 7 was tested using a 106 L semi-circular reactor containing two modules 10 starting on May 14, 2004. The reactor and module 10 details are outlined in Tables 8 and 9. Several different wastewaters have been introduced to this system, but for the majority of the operational time the system has been fed a municipal wastewater generated by a multi-purpose building containing offices, a warehouse and research labs. The wastewater was feed into an equalization tank and then pumped through a 0.5 mm screen into the system as required. There is a baffle in the middle of the tank which divides the tank into two sections and so allows for side by side tests to take place. The system is fed from the bottom and overflows at the top of the reactor to a drain.

TABLE 6

Reactor Dimensions and Operating Conditions for Hybrid Reactor and Conventional Activated Sludge (CAS).

| Parameter | units | Hybrid reactor | CAS |
| --- | --- | --- | --- |
| Tank Volume | L | 106 | 106 |
| Tank Height | M | 0.99 | 0.99 |
| Water Height | M | 0.76 | 0.76 |
| Tank Diameter | M | 0.61 | 0.61 |
| Inlet Air Pressure | Psi | 5-6 | 5-6 |

TABLE 7

Module Details

| Parameter | Units | Large module | Small module |
| --- | --- | --- | --- |
| Fiber OD | Um | 45 | 45 |
| Number of fibers/tow | | 48 | 48 |
| Fiber length | M | 0.71 | 0.7 |
| Tows per cm | tow/cm | 10 | 7 |
| Module width | M | 0.43 | 0.23 |
| Number of fiber sheets | | 12 | 12 |
| Number of modules | | 1 | 1 |
| Header type | | 400D | 400D |
| Additional Information | | Spacers installed | |

A batch test procedure was used to monitor organic contaminant and nitrogen concentration profiles in each reactor. The test procedure involved settling the solids in the tank, removing half of the supernatant, re-filling the tank with raw wastewater and starting mixing aeration to the reactor and air supply only to the modules 10. Samples of water in the tank were then every 30 to 60 minutes to measure supernatant SCOD, TSS, NH3-N, NO3-N, DO, TKN or other items of interest. Data and concentration profiles from these tests are shown in Tables 8, 9 and 19 and FIGS. 9 to 12 which show concentration profiles of the stated elements for the hybrid and CAS systems during batch testing periods. These tests show a significant benefit in terms of ammonia removal and oxygen transfer efficiency.

TABLE 8

Hybrid Reactor Results

| Time (hr) | TCOD (mg/L) | SCOD (mg/L) | NH3—N (mg/L) | NO3—N (mg/L) | TSS (mg/L) | DO (mg/L) | Mixing (SCFH) | O2 Transferred through Zeelung (g/d) | OTE (%) |
|---|---|---|---|---|---|---|---|---|---|
| 0.00 | 4500 | 175 | 89 | 0.9 | 3270 |  | 10.0 |  |  |
| 0.75 |  | 127 | 69 |  | 1790 | 2.4 | 10.0 | 28.3 | 12.5 |
| 1.30 |  | 96 | 62.5 |  | 1410 |  |  |  |  |
| 2.50 | 1790 | 91 | 57.5 | 3.2 | 1430 | 4.5 | 8.0 | 17.8 | 8.1 |
| 3.50 |  | 83 | 51.5 |  | 1520 |  |  |  |  |
| 4.50 |  | 84 | 42.5 |  | 1600 | 5.4 | 5.0 | 18.0 | 8.4 |
| 5.75 | 920 | 69 | 38 | 8.8 | 1200 | 5.0 | 5.0 |  |  |
| 6.50 |  | 95 | 35 |  | 1060 | 5.3 | 5.0 |  |  |
| 7.50 |  | 94 | 28 |  | 1190 | 4.9 | 5.0 | 11.4 | 5.3 |
| 8.50 | 670 | 92 | 24.7 | 15 | 720 | 4.9 | 5.0 |  |  |

TABLE 9

CAS Reactor Results

| Time (hr) | TCOD (mg/L) | SCOD (mg/L) | NH3—N (mg/L) | NO3—N (mg/L) | TSS (mg/L) | DO (mg/L) | Mixing (SCFH) |
|---|---|---|---|---|---|---|---|
| 0.00 | 3340 | 107 | 57 | 0.9 | 2570 |  | 10.0 |
| 0.75 |  | 56 | 61 | 0.9 | 2290 | 1.0 | 9.5 |
| 1.30 |  | 64 | 59.5 | 0.7 | 2320 |  |  |
| 2.50 | 2750 | 70 | 55 | 0.7 | 2090 | 3.2 | 9.0 |
| 3.50 |  | 73 | 46.5 | 6.7 | 2287 |  |  |
| 4.50 |  | 69 | 49 | 4.2 | 2373 | 4.5 | 6.0 |
| 5.75 | 2390 | 51 | 46.5 | 6.5 | 2140 | 3.0 | 5.0 |
| 6.50 |  | 60 | 36.5 | 9.4 |  | 2.5 | 6.0 |
| 7.50 |  | 49 | 39.6 | 11.9 | 2107 | 2.8 | 6.0 |
| 8.50 | 2420 | 69 | 35.3 | 13.8 | 2167 | 2.8 | 6.0 |

TABLE 10

Nitrification and activity comparison

| | Date | | |
|---|---|---|---|
| | 3-Apr | 7-June | Unit |
| CAS Test Results | | | |
| Tank Volume | 106 | 106 | L |
| Bulk TSS Concentration | 1940 | 2570 | mg/L |
| Total Bulk Solid | 205.64 | 272.42 | g |
| Inf. NH3—N Concentration | 83.5 | 61 | mg/L |
| Eff. NH3—N Concentration | 66.5 | 35.3 | mg/L |
| Test Period | 5 | 7.75 | hr |
| NH3—N removal rate | 42.06 | 30.97 | mg NH3—N/g TSS/day |
| NH3—N removal rate | 0.082 | 0.080 | kg NH3—N/m3/day |
| Hybrid Test Results | | | |
| ZL Module Volume | 30 | 23 | L |
| Tank Volume | 76 | 83 | L |
| ZL TS | 1320 | 528.2 | g |
| Bulk TSS Concentration | 1820 | 3270 | mg/L |
| Total Bulk Solid | 138.32 | 271.41 | g |
| Inf. NH3—N Concentration | 79 | 89 | mg/L |
| Eff. NH3—N Concentration | 5.5 | 24.7 | mg/L |
| Test Period | 5.5 | 8.5 | hr |
| NH3—N removal rate | 16.71 | 18.85 | mg NH3—N/g TSS/day |
| NH3—N removal rate | 0.321 | 0.182 | kg NH3—N/m3/day |
| NH3—N Removal Rate Comparison | | | |
| NH3—N removal due to bulk TSS | 1.33 | 2.98 | g NH3—N |
| NH3—N removal due to ZL Module | 4.25 | 2.36 | g NH3—N |
| NH3—N removal rate due to bulk TSS | 42.06 | 30.97 | mg NH3—N/g TSS/day |
| NH3—N removal rate due to ZL Module Solid | 14.06 | 12.62 | mg NH3—N/g TSS/day |
| Bulk Solid Activity | 2.99 | 2.45 | times |

The invention protected by this patent is defined by the following claims. The description of one or more apparatuses or processes above was intended to describe at least one example of an embodiment of each claim. However, a claim might, or might not, read on more than one apparatus or process described above and it is possible that an apparatus or process was described above that is not within any claim, or has features that are not an element of any claim. Accordingly, the claims are not limited to having features that are common to multiple apparatuses or processes described above or to having all of the features of any particular process or apparatus described above. Embodiments other than those described above may be created within the scope of the claims.

We claim:

1. A membrane-supported biofilm apparatus comprising a module having a plurality of gas permeable hollow fiber membranes collected at a lower end in a header and having upper ends adapted to be floated near a water surface when the module is immersed in a tank of water with the header on or near the bottom of the tank.

2. The apparatus of claim 1 wherein the membranes are impermeable to bulk or advective water flow and have an outside diameter of about 200 microns or less and a length within the range of about 3-10 meters.

3. The apparatus of claim 1 comprising a tank, wherein the membranes are placed in the tank at a dry fiber packing density in the range of about 0.5% to 4%.

4. The apparatus of claim 1 comprising a tank, wherein the membranes are located in the tank and support a biofilm occupying about 40% or more of the volume of the tank.

5. A membrane-supported biofilm apparatus comprising a module having a plurality of gas permeable hollow fiber membranes collected at a lower end in a header and having upper ends adapted to be held or floated near a water surface when the module is immersed in a tank of water with the header on or near the bottom of the tank and further comprising a spreader near the header to horizontally space some of the plurality of membranes from others of the plurality of membranes.

6. The apparatus of claim 1 wherein the header is attached to an air supply manifold on or near the bottom of a tank containing the membranes.

7. A membrane-supported biofilm apparatus comprising two or more modules each having a plurality of gas permeable hollow fiber membranes collected at a lower end in a header and having upper ends adapted to be held or floated near a water surface when the module is immersed in a tank of water with the header on or near the bottom of the tank wherein a first module is located in a first tank and has a lower dry fiber packing density than a second module located in a second tank downstream of the first tank.

8. The apparatus of claim 1 wherein the module is located in a tank and further comprising a mixer and a solids removal port on or near the bottom of the tank.

9. The apparatus of claim 1 comprising a tank, wherein the membranes are located in the tank and support a biofilm occupying about 80% or less of the volume of the tank.

10. The apparatus of claim 1 wherein the membranes are located in a tank comprising channels at a feed end of the tank for feed dispersal.

* * * * *